US012575914B2

(12) United States Patent
Chiosa

(10) Patent No.: US 12,575,914 B2
(45) Date of Patent: Mar. 17, 2026

(54) DIGITAL TOOTH MODEL REPLACEMENT

(71) Applicant: EXOCAD GMBH, Darmstadt (DE)

(72) Inventor: Iurie Chiosa, Weiterstadt (DE)

(73) Assignee: EXOCAD GMBH, Darmstadt (DE)

( * ) Notice: Subject to any disclaimer, the term of this patent is extended or adjusted under 35 U.S.C. 154(b) by 122 days.

(21) Appl. No.: 18/732,150

(22) Filed: Jun. 3, 2024

(65) Prior Publication Data

US 2025/0366956 A1 Dec. 4, 2025

(51) Int. Cl.
| | |
|---|---|
| *A61C 9/00* | (2006.01) |
| *A61C 7/00* | (2006.01) |
| *A61C 13/00* | (2006.01) |
| *A61C 13/34* | (2006.01) |

(52) U.S. Cl.
CPC .............. *A61C 9/002* (2013.01); *A61C 7/002* (2013.01); *A61C 13/0004* (2013.01); *A61C 13/34* (2013.01)

(58) Field of Classification Search
CPC .......... A61C 9/002; A61C 7/002; A61C 13/34
See application file for complete search history.

(56) References Cited

U.S. PATENT DOCUMENTS

| | | | | |
|---|---|---|---|---|
| 12,201,489 B2 * | 1/2025 | Gerth | ...................... | G06F 30/20 |
| 12,414,845 B2 * | 9/2025 | Lobsiger | ................ | G16H 50/20 |
| 12,465,440 B1 * | 11/2025 | Zak | ......................... | A61B 34/25 |
| 2011/0066267 A1 | 3/2011 | Schmitt | | |
| 2022/0165388 A1 | 5/2022 | Chernov et al. | | |
| 2023/0039130 A1 * | 2/2023 | Peng | .................... | G06N 3/0464 |
| 2023/0255726 A1 * | 8/2023 | Yan | ......................... | G16H 20/30 |
| | | | | 433/24 |

* cited by examiner

*Primary Examiner* — Sunil K Singh
(74) *Attorney, Agent, or Firm* — Perry + Currier Inc.

(57) ABSTRACT

Disclosed is a method for replacing first three-dimensional digital tooth models by second three-dimensional digital tooth models. The method comprises receiving a three-dimensional digital anatomic model of an oral anatomic structure of a patient and the first three-dimensional digital tooth models arranged with respect to the three-dimensional digital anatomic model at tooth positions with tooth orientations. The first three-dimensional digital tooth models comprise first identifiers identifying the dental key structures. First three-dimensional digital tooth models are selected for a replacement. The selected first three-dimensional digital tooth models are replaced by the second three-dimensional digital tooth models.

20 Claims, 15 Drawing Sheets

| | |
|---|---|
| Receiving 3D digital anatomic model of oral anatomic structure | <u>200</u> |
| Receiving first 3D digital tooth models | <u>202</u> |
| Arranging the first 3D digital tooth models | <u>204</u> |
| Selecting first 3D digital tooth models | <u>206</u> |
| Replacing selected first 3D digital tooth models | <u>208</u> |

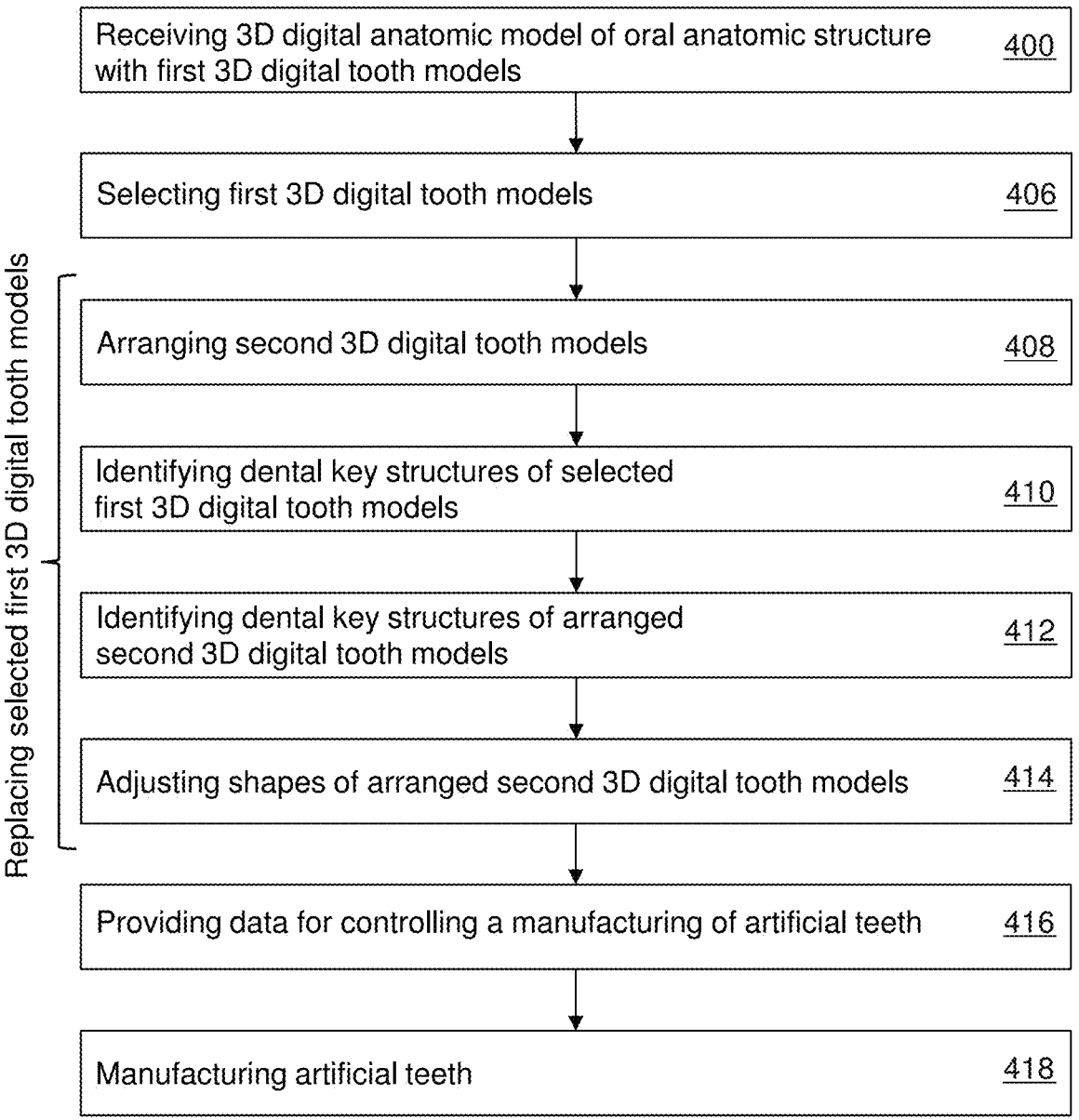

Receiving 3D digital anatomic model of oral anatomic structure with first 3D digital tooth models    400

Selecting first 3D digital tooth models    406

Arranging second 3D digital tooth models    408

Identifying dental key structures of selected first 3D digital tooth models    410

Identifying dental key structures of arranged second 3D digital tooth models    412

Adjusting shapes of arranged second 3D digital tooth models    414

Providing data for controlling a manufacturing of artificial teeth    416

Manufacturing artificial teeth    418

Replacing selected first 3D digital tooth models

Fig. 4

| Scanning physical tooth models | 500 |

| Generating a set of 3D digital templates | 502 |

| Marking dental key structures | 504 |

DIGITAL TOOTH MODEL REPLACEMENT

FIELD OF THE INVENTION

The invention relates to the field of dental technology, in particular to a method for replacing first three-dimensional digital tooth models with second three-dimensional digital tooth models.

BACKGROUND

In modern dental technology, computer-based approaches are used for configuring templates for artificial teeth in form of three-dimensional digital tooth models taking into account a patient's intraoral anatomical state. However, when the three-dimensional digital tooth models have been arranged and, e.g., adjusted to the patient's intraoral anatomical state, it becomes challenging to replace the three-dimensional digital tooth models by three-dimensional digital replacement models. In general, the whole arranging and/or adjusting has to be repeated for the three-dimensional digital replacement models from the start, causing a lot of extra work for a practitioner, like a dental technician or a dentist.

SUMMARY

It is an objective to provide for a method, a program product, and a computer device for replacing one or more first three-dimensional digital tooth models of a first set of three-dimensional digital templates for artificial teeth by one or more second three-dimensional digital tooth models of a second set of three-dimensional digital templates for artificial teeth. The objectives underlying the invention are solved by the features of the independent claims.

In one aspect a method is disclosed for replacing one or more first three-dimensional digital tooth models of a first set of three-dimensional digital templates for artificial teeth by one or more second three-dimensional digital tooth models of a second set of three-dimensional digital templates for artificial teeth.

The method comprises receiving a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures. One or more first three-dimensional digital tooth models of the one or more arranged first three-dimensional digital tooth models are selected for a replacement. The selected one or more first three-dimensional digital tooth models are replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures.

The replacing comprises arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models. The one or more tooth orientations may also comprise inclinations of the respective one or more first three-dimensional digital tooth models relative to oral anatomic structure of a patient as defined by the three-dimensional digital anatomic model. The one or more dental key structures of the selected one or more first three-dimensional digital tooth models are identified using the one or more first identifiers. The one or more dental key structures of the arranged one or more second three-dimensional digital tooth models are identified using the one or more second identifiers. One or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

Examples may have the beneficial effect that they allow for a switching between different sets of three-dimensional digital templates for artificial teeth. When switching, i.e., replacing the three-dimensional digital tooth models of one set by three-dimensional digital tooth models of another set, dental key structures of the three-dimensional digital tooth models are matched such that they may be equal or at least equal within predefined range of tolerance. By adjusting the dental key structures of the second three-dimensional digital tooth models to match the dental key structures of the first three-dimensional digital tooth models, the dental key structures of the first three-dimensional digital tooth models are adopted by the second three-dimensional digital tooth models. This enables the second three-dimensional digital tooth models to keep their characteristics differentiating them from the first three-dimensional digital tooth models, while adopting the characteristics of the dental key structures of the first three-dimensional digital tooth models.

The identified one or more dental key structures of the adjusted one or more second three-dimensional digital tooth models matching the one or more identified dental key structures of the selected one or more first three-dimensional digital tooth models may, e.g., refer to characteristics of the dental key structures of the adjusted one or more second three-dimensional digital tooth models, like form, position, and/or orientation of these dental key structures, are adjusted to be equal to or equal within a predefined range of tolerance to characteristics of the dental key structures of the selected one or more first three-dimensional digital tooth models, like form, position, and/or orientation of these dental key structures.

This may be beneficial, when the first three-dimensional digital tooth models and thus their dental key structures have been adjusted to the individual oral anatomic structure of a patient. By automatically adopting the dental key structures, i.e., their characteristics, of the first three-dimensional digital tooth models by the second three-dimensional digital tooth models, the adjustments of these dental key structures may be transferred efficiently and effectively from the first three-dimensional digital tooth models to the second three-dimensional digital tooth models, while maintaining other individual characteristics of the second three-dimensional digital tooth models.

This efficient adoption is enabled by the identifiers identifying dental key structures of the second three-dimensional digital tooth models. Thus, when the three-dimensional digital tooth models, e.g., first and/or second three-dimensional digital tooth models, are provided, their dental key structures can easily be identified using the identifiers.

Theses identifiers may, e.g., be provided in form of additional labels or tags added to the datasets describing the three-dimensional digital tooth models and identifying structural elements, e.g., mesh sections or vertices, of the three-dimensional digital tooth models, which are part of the dental key structure. In addition, the identifiers may also identify the type of dental key structure. By transferring characteristics, i.e., configurations of dentals key structures from one three-dimensional digital tooth model to another, key features of the former one defined by the dentals key structures may be adopted by the later one.

The first and second three-dimensional digital tooth models both comprise the same dental key structures. However, characteristics, like form, position, and/or orientation, of these dental key structures may differ between the first and second three-dimensional digital tooth models. By adjusting the shape of the second three-dimensional digital tooth models, the characteristics of the dental key structures of the second three-dimensional digital tooth models, e.g., form, position, and/or orientation of these dental key structures, may be adjusted to match, i.e., to resemble the characteristics of the dental key structures of the first three-dimensional digital tooth models, e.g., form, position, and/or orientation of these dental key structures.

Examples may, e.g., enable a switch between different sets of teeth, i.e., set of three-dimensional digital templates for artificial teeth, with a quasi-exact tooth aligning and/or fitting. For example, a switching between different sets of teeth may be enabled, which preserves a pre-existing inter-tooth occlusion, i.e., an inter-tooth occlusion of the first three-dimensional digital tooth models, by the second three-dimensional digital tooth models, while a morphology and/or characteristic tooth appearance of the second three-dimensional digital tooth models is maintained. This preservation may, e.g., be enabled by the adjustments focused on the identified dental key structures. For example, a switching between different sets of teeth may be enabled, which preserves a general tooth shape, e.g., rectangular, triangular, or oval, of the first three-dimensional digital tooth models by the second three-dimensional digital tooth models, while a morphology and/or characteristic of the second three-dimensional digital tooth models is maintained. This preservation may, e.g., be enabled by the adjustments focused on the identified dental key structures.

There is a wide variety of potential tooth shapes. Tooth shapes may differ in many ways from human to human. Therefore, three-dimensional digital templates for artificial teeth may differ in many ways. When providing sets of three-dimensional digital templates for artificial teeth, e.g., predefined sets like tooth libraries, tooth shapes defined by these sets may differ from set to set in many ways. Such sets of three-dimensional digital templates for artificial teeth may provide a reservoir of potential tooth shapes to select from, when looking for a suitable tooth shape for a particular patient.

However, due to these differences in tooth shapes, it becomes challenging to find a suitable fit, when trying to replace one three-dimensional digital tooth model by another one with a different tooth shape. This challenge becomes even worse, since the tooth shapes may not be only about a general appearance of the teeth, but may also have functional impacts, which have to be taken into account.

Example may enable an effective and efficient fitting, which is focused on the dental key structures, while other features of the second three-dimensional digital tooth models remain unchanged. Thus, it may be avoided that the shapes of the second three-dimensional digital tooth models are adjusted completely, such that structural differences characterizing the different tooth shapes are removed. For example, the shape adjustments focused on and/or restricted to the identified dental key structures may result in approximating of a general tooth shape of the first three-dimensional digital tooth models by the second three-dimensional digital tooth models. A general tooth shape may, e.g. be a rectangular, a triangular, or an oval form. The general tooth shape describes an overall two-dimensional shape of a vestibular surface of a tooth. This general tooth shape may, e.g., strongly influence an aesthetic appearance of a patient's teeth and/or smile. Thus, when switching from the first three-dimensional digital tooth models to the second three-dimensional digital tooth models, the general tooth shapes of the first three-dimensional digital tooth models may be persevered by the second three-dimensional digital tooth models, while at the same time a specific morphology and characteristic structural features of the second three-dimensional digital tooth models remain unchanged.

A vestibular surface and thus a general tooth shape of a tooth and/or three-dimensional tooth model may, e.g. be rectangular-shaped, triangular-shaped, or oval-shaped. In case of a rectangular-shaped general tooth shape, a gingival or cervical width of the tooth at a gingival line is approximately equal to a coronal width of the tooth at the opposite end. In case of a triangular-shaped general tooth shape, the gingival or cervical width of the tooth is narrower than the coronal width. In case of an oval-shaped general tooth shape, the gingival or cervical width of the tooth is approximately equal to the coronal width, with the both ends of the tooth, i.e., the gingival as well as coronal end, being slightly rounded.

A rectangular shape may result in no or no relevant gaps between adjacent teeth. A triangular shape may result in inverted triangular gaps between adjacent teeth. An oval shape may result in a gap between adjacent teeth, that increases in coronal direction due to the convex curving of the teeth toward their coronal ends.

Rectangular, triangular, an oval may be considered the main types of general tooth shapes. Depending on the length of a tooth, its general tooth shape may, e.g., be identified as square rather than rectangular, in case the length approximately equals its equatorial width. Depending on the degree or radius of curvature of a tooth towards its coronal and gingival end, it may, e.g., be identified as round or pointed-oval rather than oval.

Fitting a second three-dimensional digital tooth model defining a second tooth shape to a first three-dimensional digital tooth model defining a first tooth shape, such that all the structural features match, would result in the second three-dimensional digital tooth model resembling the first tooth shape. However, when exchanging three-dimensional digital tooth models defining different tooth shapes, the goal is to replace the first three-dimensional digital tooth model by the second three-dimensional digital tooth model, such that the second three-dimensional digital tooth model satisfies the anatomical and functional features configured for the first three-dimensional digital tooth model, while maintaining structural differences characterizing the different tooth shapes. This may be achieved by examples described herein.

Considering two three-dimensional digital tooth model defining different tooth shapes, when trying to fit one of the three-dimensional digital tooth models to the other, a part of the tooth model may fit well, while other parts may no longer fit. Focusing the fitting, i.e., the adjusting on dental key structures being identified by the identifiers, such problems may be avoided and at the same time, it may be ensured that dental key structures, i.e., key parts are fitted suitably.

For example, the arranging of the one or more second three-dimensional digital tooth models with respect to the three-dimensional digital anatomic model at the one or more tooth positions of the selected one or more first three-dimensional digital tooth models may comprise arranging the one or more second three-dimensional digital tooth models such that a center of each of the second three-dimensional digital tooth models coincides with a center of a corresponding first three-dimensional digital tooth model.

For example, the arranging of the one or more second three-dimensional digital tooth models with respect to the three-dimensional digital anatomic model with the one or more tooth orientations of the selected one or more first three-dimensional digital tooth models may comprise aligning an orientation of each of the second three-dimensional digital tooth models, such that it coincides with an orientation a corresponding first three-dimensional digital tooth model. The aligning may, e.g., comprise aligning an orientation of a second local coordinate system of the respective second three-dimensional digital tooth model with a first local coordinate system of the corresponding first three-dimensional digital tooth model, such that the second local coordinate system coincides with the first local coordinate system.

The local coordinate systems may, e.g., be cartesian coordinate systems.

A Cartesian coordinate system comprises an ordered triplet of axes that go through a common origin of the coordinate system and are pair-wise perpendicular to each other, an orientation for each axis, and a single unit of length for the axes.

For example, the axes of the local coordinate systems may be aligned with anatomical directions of the three-dimensional digital tooth models. For example, an axis may be aligned with a vestibular or oral direction. For example, an axis may be aligned with a mesial or distal direction. For example, an axis may be aligned with an occlusal and/or incisal direction.

Examples may enable performing a feature label-based adjusting, i.e., an adjusting using the identifiers, with which the dental key structures of the three-dimensional digital tooth models are marked. The identifiers identify the respective dental key structures. Thus, the same dental key structures, i.e., the same type of dental key structure, may be identified for the selected first three-dimensional digital tooth models using the first identifiers and for the second three-dimensional digital tooth models using the second identifiers. The adjusting may then be focused and/or restricted to an adjusting of the second three-dimensional digital tooth models, such that the identified dental key structures of the second three-dimensional digital tooth models coincide with the identified dental key structures of the first three-dimensional digital tooth models. Thus, the second three-dimensional digital tooth models may be adjusted, e.g., deformed, to best fit a given configuration of the first three-dimensional digital tooth models and by that preserving certain anatomical criteria satisfied by the first three-dimensional digital tooth models, e.g., an existing inter tooth occlusion of the first three-dimensional digital tooth models.

For example, an existing inter tooth occlusion of the first three-dimensional digital tooth models may be matched by using cusps as dental key structures and identifiers identifying the cusps. For example, the second three-dimensional digital tooth models may be adjusted, e.g. deformed, at the cusps identified by the identifiers. For example, the identified cusps of the second three-dimensional digital tooth models are by a deformation of the second three-dimensional digital tooth models moved to the location of the identified cusps of the first three-dimensional digital tooth models.

When the one or more second three-dimensional digital tooth models are arranged with respect to the three-dimensional digital anatomic model at the one or more tooth positions of the selected one or more first three-dimensional digital tooth models and with the one or more tooth orientations of the selected one or more first three-dimensional digital tooth models, e.g., occlusion pre-requirements of an occlusal surface, in particular of cusps, may not be fulfilled by the second three-dimensional digital tooth models.

For example, the dental key structures identified by the first and second identifiers are cusps. By adjusting the shapes of the second three-dimensional digital tooth models, such that the positions of the identified cusps of the second three-dimensional digital tooth models are adjusted to the positions of the identified cusps of the first three-dimensional digital tooth models an occlusion defined for the first three-dimensional digital tooth models may be maintained by the second three-dimensional digital tooth models. Thus, an occlusion adjustment may be transferred from the first three-dimensional digital tooth models to the second three-dimensional digital tooth models.

Examples may avoid an exact and complete transformation of the second three-dimensional digital tooth models into the first three-dimensional digital tooth model, i.e., a deforming of the second tooth shapes defined by the second three-dimensional digital tooth models resulting in a transformation of the second tooth shapes into the first tooth shapes defined by the first three-dimensional digital tooth models. Such an exact transformation would result in a deforming of the tooth shapes defined by the second three-dimensional digital tooth models identically into the tooth shapes defined by the first three-dimensional digital tooth models. Thus, any characteristic morphology of the second three-dimensional digital tooth models would be get lost. Examples may avoid such a loss of the characteristic morphology of the second three-dimensional digital tooth models, which at least in part may be maintained.

Examples may enable an adjusting of the second three-dimensional digital tooth models to match certain dental key structures and their characteristics as defined by the first three-dimensional digital tooth models, while maintaining a second morphology of the second three-dimensional digital tooth models, by which the second three-dimensional digital tooth models differ from the first three-dimensional digital tooth models with a first morphology.

According to examples, only certain dental key structures, e.g., defining most prominent tooth shape features of the second three-dimensional digital tooth models, may be adjusted, e.g., deformed and fitted to the dental key structures as defined by the first three-dimensional digital tooth models.

Examples may enable a presevering of morphological characteristics of tooth shapes defined by the second three-dimensional digital tooth models, when the second three-dimensional digital tooth models are adjusted.

Examples may, e.g., comprise first arranging the second three-dimensional digital tooth models with respect to the three-dimensional digital anatomic model at the tooth positions and with the tooth orientations of the selected first three-dimensional digital tooth models to be replaced by the second ones. Then shapes of the arranged the second three-dimensional digital tooth models may be adjusted to match the dental key structures identified by the second identifiers of the second three-dimensional digital tooth models to the identified by the first identifiers of the first three-dimensional digital tooth models. Matching means that form, position and/or orientation of the identified dental key structures of the second three-dimensional digital tooth models are adjusted such that they are identical or at least identical within a predefined range of tolerance with form, position and/or orientation of the identified dental key structures of the first three-dimensional digital tooth models.

If an identified dental key structure of the second three-dimensional digital tooth model is comprised by an upper part of the second three-dimensional digital tooth model, the upper part of the second three-dimensional digital tooth model may be adjusted, such that the identified dental key structure of the second three-dimensional digital tooth model matches the identified dental key structure of the first three-dimensional digital tooth model, while the rest of the second three-dimensional digital tooth model remains unchanged, i.e. is kept fixed. The rest of the second three-dimensional digital tooth model may comprise a lower and/or middle part of the second three-dimensional digital tooth model, the form, position and/or orientation of which may be maintained.

If an identified dental key structure of the second three-dimensional digital tooth model is comprised by a lower part of the second three-dimensional digital tooth model, the lower part of the second three-dimensional digital tooth model may be adjusted, such that the identified dental key structure of the second three-dimensional digital tooth model matches the identified dental key structure of the first three-dimensional digital tooth model, while the rest of the second three-dimensional digital tooth model remains unchanged, i.e. is kept fixed. The rest of the second three-dimensional digital tooth model may comprise an upper and/or middle part of the second three-dimensional digital tooth model, the form, position and/or orientation of which may be maintained.

If an identified dental key structure of the second three-dimensional digital tooth model is comprised by a middle part of the second three-dimensional digital tooth model, the middle part of the second three-dimensional digital tooth model may be adjusted, such that the identified dental key structure of the second three-dimensional digital tooth model matches the identified dental key structure of the first three-dimensional digital tooth model, while the rest of the second three-dimensional digital tooth model remains unchanged, i.e. is kept fixed. The rest of the second three-dimensional digital tooth model may be an upper and lower part of the second three-dimensional digital tooth model, the form, position and/or orientation of which may be maintained.

For example, first the second three-dimensional digital tooth models may be arranged with respect to the three-dimensional digital anatomic model at the tooth positions and with the tooth orientations of the selected first three-dimensional digital tooth models to be replaced by the second ones.

In addition, the arranging may, e.g., comprise scaling sizes of one or more of the second three-dimensional digital tooth models. For example, the size of the second three-dimensional digital tooth models may be adjusted to match the size of the first three-dimensional digital tooth models. Adjusting the size may, e.g., comprise adjusting a length and/or diameter of the second three-dimensional digital tooth models. Adjusting a length of a second three-dimensional digital tooth model may, e.g., comprise adjusting a maximum length, a minimum length, or a mean length of this second three-dimensional digital tooth model. Adjusting a diameter of a second three-dimensional digital tooth model may, e.g., comprise adjusting a maximum diameter, a minimum diameter, or a mean diameter of this second three-dimensional digital tooth model.

Then, a dental key structure adjustment may be performed. For as adjusting the dental key structures, the shapes of the second three-dimensional digital tooth models may be adjusted. In particular sections of the shapes of the second three-dimensional digital tooth models may be adjusted, which comprise the dental key structures. By adjusting dental key structures of the second three-dimensional digital tooth models to match dental key structures of the first three-dimensional digital tooth models, a configuration of the dental key structures defined for the first three-dimensional digital tooth models may be transferred to the second three-dimensional digital tooth models.

When adjusting a shape of a second three-dimensional digital tooth model, e.g., a section of the shape of the three-dimensional digital tooth model comprising the one or more dental key structures of the second three-dimensional digital tooth model to be adjusted may be adjusted, while a rest of the shape of the second three-dimensional digital tooth model may be maintained unchanged.

For example, the one or more dental key structures of the second three-dimensional digital tooth model to be adjusted may comprise one or more cusps of the second three-dimensional digital tooth model. The adjusting of the shape of the second three-dimensional digital tooth model may, e.g., comprise adjusting the cusps, while a rest of the shape of the second three-dimensional digital tooth model may be maintained unchanged. The cusps may, e.g., be translated, rotated, scaled, and/or deformed, while a cervical part of the second three-dimensional digital tooth model may, e.g., be maintained unchanged.

For example, the one or more dental key structures of the second three-dimensional digital tooth model to be adjusted may comprise a cervical boundary line. The adjusting of the shape of the second three-dimensional digital tooth model may, e.g., comprise adjusting a cervical part of the second three-dimensional digital tooth model comprising the cervical boundary line, while a rest of the shape of the second three-dimensional digital tooth model may be maintained unchanged. The cervical part of the shape may, e.g., be translated, rotated, scaled and/or deformed. An incisal part, in case of an incisor or canine, or a chewing part, in case of a premolar or molar, may, e.g., be maintained unchanged.

For example, the one or more dental key structures of the second three-dimensional digital tooth model to be adjusted may comprise an equatorial line.

The adjusting of the shape of the second three-dimensional digital tooth model may, e.g., comprise adjusting a middle part of the second three-dimensional digital tooth model comprising the cervical equatorial line, while a rest of the shape of the second three-dimensional digital tooth model may be maintained unchanged. The middle part of the shape may, e.g., be translated, rotated, scaled and/or deformed, while other parts, like a cervical and/or a crown part, may, e.g., be maintained unchanged.

An adjusting a dental key structure of a second three-dimensional digital tooth model in form of an incisal edge may, e.g., comprise a deforming of the incisal edge in addition to an occlusal translated, rotated, and/or scaling. For adjusting a dental key structure of a second three-dimensional digital tooth model in form of an incisal edge, e.g., an occlusal scaling may not be sufficient for matching an incisal edge of a first three-dimensional digital tooth model.

The first and second set being sets of three-dimensional digital templates for artificial teeth refers to the fact that three-dimensional digital tooth models comprised by the sets are templates to be used for manufacturing artificial teeth. Nevertheless, the three-dimensional digital tooth models may, e.g., be models of library teeth of tooth libraries, i.e., models of artificial teeth. They may as well be models of natural teeth, which have been scanned and, e.g., segmented. These three-dimensional digital tooth models resembling natural teeth may, e.g., be used as templates for manufacturing artificial teeth. These three-dimensional digital tooth models may, e.g., resemble natural teeth to be used specifically used one-time, e.g., for a specific patient. These three-dimensional digital tooth models resembling natural teeth may, e.g., be tooth models resulting from a scan and saved as part of a tooth library, e.g., to be used for different patients.

The second three-dimensional digital tooth models, e.g., are used to replace first three-dimensional digital tooth models of the same dental type. The dental types may, e.g., comprise incisors, canines, premolars, and molars. The second three-dimensional digital tooth models, which are arranged at a tooth position and with a tooth orientation of a first three-dimensional tooth model are of the same tooth type as the three-dimensional digital tooth models, at which tooth position they are arranged. For example, a second three-dimensional digital tooth model is a model of an incisor used to replace a first three-dimensional digital tooth model of an incisor. For example, a second three-dimensional digital tooth model is a model of a canine used to replace a first three-dimensional digital tooth model of a canine. For example, a second three-dimensional digital tooth model is a model of a premolar used to replace a first three-dimensional digital tooth model of a premolar. For example, a second three-dimensional digital tooth model is a model of a molar used to replace a first three-dimensional digital tooth model of a molar.

For example, the adjusting of the one or more shapes of the arranged one or more second three-dimensional digital tooth models comprises applying one or more adjustments to one or more sections of the one or more shapes comprising the identified one or more dental key structures. The applied adjustments comprise one or more of the following adjustments: a translation, a rotation, a scaling, a deformation.

By adjusting sections of the shapes of the second three-dimensional digital tooth models comprising the identified dental key structures, the identified dental key structures of the second three-dimensional digital tooth models may be adjusted to match the identified dental key structures of the selected first three-dimensional digital tooth models.

The adjusting may, e.g., comprise a translation of one or more of the second three-dimensional digital tooth models. The adjusting may, e.g., comprise a rotation of one or more of the second three-dimensional digital tooth models. The adjusting may, e.g., comprise a scaling of one or more of the second three-dimensional digital tooth models. The scaling may, e.g., comprise an inflating of a shrinking of the respective second three-dimensional digital tooth models being scaled. The adjusting may, e.g., comprise a deforming of one or more of the second three-dimensional digital tooth models.

The adjusting of a section comprising an identified dental key structure may, e.g., comprise a translation of the section. For example, the translation may result in a partial deforming of the shape of the second three-dimensional digital tooth model being adjusting. The deforming may, e.g., comprise a local stretching and/or a local compressing of one or more transition sections between the translated section and sections of the second three-dimensional digital tooth model, which remain unchanged.

The adjusting of a section comprising the identified dental key structures may, e.g., comprise a rotation of the section. For example, the rotation may result in a partial deforming of the shape of the second three-dimensional digital tooth model being adjusting. The deforming may, e.g., comprise a deforming of transition sections arranged between the rotated section and sections of the second three-dimensional digital tooth model, which remain unchanged.

The adjusting of a section comprising the identified dental key structures may, e.g., comprise a scaling, e.g., an inflating or a shrinking of the respective section. For example, the scaling may result in a partial deforming of the shape of the second three-dimensional digital tooth model being adjusting. The deforming may, e.g., comprise a local stretching and/or a local compressing of one or more transition sections arranged between the scaled section and sections of the second three-dimensional digital tooth model, which remain unchanged.

The adjusting of a section comprising the identified dental key structures may, e.g., comprise a deforming of the section. For example, the deforming may result in a partial deforming of the shape of the second three-dimensional digital tooth model being adjusting, while other sections of the second three-dimensional digital tooth model remain unchanged.

For example, the method further comprises maintaining positions, orientations, sizes, and shapes of remaining sections of the one or more shapes of the one or more second three-dimensional digital tooth models, while adjusting the sections of the one or more second three-dimensional digital tooth models comprising the identified one or more dental key structures.

By maintaining the remaining sections of the second three-dimensional digital tooth models unchanged, characteristic features of the second three-dimensional digital tooth models comprised by these sections may be maintained, while the identified dental key structures of the second three-dimensional digital tooth models may be adjusted and matched to the identified dental key structures of the first three-dimensional digital tooth models.

For example, the arranging of the one or more second three-dimensional digital tooth models comprises scaling sizes of one or more of the second three-dimensional digital tooth models.

For example, the second three-dimensional digital tooth models may be scaled, i.e., inflated or shrunk, to match sizes of the first three-dimensional digital tooth models. In addition to tooth positions and tooth orientations, also the sizes of the first three-dimensional digital tooth models may be taken into account, when arranging the second three-dimensional digital tooth models.

Adjusting the size may, e.g., comprise adjusting length and/or diameter of the second three-dimensional digital tooth models by inflating or shrinking the second three-dimensional digital tooth models. Adjusting a length of a second three-dimensional digital tooth model may, e.g., comprise adjusting a maximum length, a minimum length, or a mean length of this second three-dimensional digital tooth model. Adjusting a diameter of a second three-dimensional digital tooth model may, e.g., comprise adjusting a maximum diameter, a minimum diameter, or a mean diameter of this second three-dimensional digital tooth model. The length and/or diameter of the second three-dimensional digital tooth model may be adjusted, such that it becomes equal to or at least equal within a predefined range of tolerance to a length and/or diameter of a first three-dimensional digital tooth model to be replaced by the respective second three-dimensional digital tooth model.

For example, the one or more dental key structures comprise one or more of the following: occlusal contact patches, approximal contact patches, cervical boundary lines, equatorial lines, chewing surfaces, cusps, fissures, incisal edges.

Dental key structures of a second three-dimensional digital tooth model may, e.g., comprise one or more occlusal contact patches. Occlusal contact patches are sections of a surface of the second three-dimensional digital tooth model, which are in occlusal contact with a three-dimensional digital antagonist model of an antagonist of the second three-dimensional digital tooth model.

Dental key structures of a second three-dimensional digital tooth model may, e.g., comprise one or more approximal contact patches. Approximal contact patches are sections of a surface of the second three-dimensional digital tooth model, which are in contact with a three-dimensional digital tooth model of a neighboring tooth arranged next to the second three-dimensional digital tooth model in an approximal direction, e.g., mesial or distal direction.

Dental key structures of a second three-dimensional digital tooth model may, e.g., comprise a cervical boundary line. The cervical boundary line may define a cervical boundary of the second three-dimensional digital tooth model.

Dental key structures of a second three-dimensional digital tooth model may, e.g., comprise an equatorial line. The equatorial line may define an equator of the second three-dimensional digital tooth model.

Dental key structures of a second three-dimensional digital tooth model may, e.g., comprise a chewing surface, e.g., an occlusal surface of the second three-dimensional digital tooth model.

Dental key structures of a second three-dimensional digital tooth model may, e.g., comprise one or more cusps. Dental key structures of a second three-dimensional digital tooth model may, e.g., comprise one or more cusp tips.

Dental key structures of a second three-dimensional digital tooth model may, e.g., comprise one or more fissures. Dental key structures of a second three-dimensional digital tooth model may, e.g., comprise one or more fissure low points.

Dental key structures of a second three-dimensional digital tooth model may, e.g., comprise an incisal edge.

A dental key structure of a three-dimensional digital tooth model may, e.g., comprise surface points, surface lines, and/or surface section of a surface of the three-dimensional digital tooth model. The surface points, surface lines, and/or surface section may, e.g., form one or more of the following: occlusal contact patches, approximal contact patches, cervical boundary lines, equatorial lines, chewing surfaces, cusps, fissures, incisal edges.

For example, the receiving of the three-dimensional digital anatomic model and the one or more first three-dimensional digital tooth models comprise receiving the three-dimensional digital anatomic model without the one or more first three-dimensional digital tooth models of the first set of three-dimensional digital templates for artificial teeth. The the one or more first three-dimensional digital tooth models are received, i.e., in addition to the three-dimensional digital anatomic model. The received one or more first three-dimensional digital tooth models are arranged with respect to the three-dimensional digital anatomic model at the one or more tooth positions with the one or more tooth orientations.

For example, the arranging of the first three-dimensional digital anatomic models may comprise a translation, rotation, inclination, and/or scaling of the first three-dimensional digital anatomic models.

For example, in a first step one or more first three-dimensional digital tooth models, e.g., of one or more library teeth of a first tooth library, may be adjusted for a patient. For this purpose, a patient's three-dimensional digital anatomic model may be received, and the one or more first three-dimensional digital tooth models may be adjusted to the three-dimensional digital anatomic model. The one or more first three-dimensional digital tooth models may be adjusted to exactly define a size, position, and orientation of the teeth resembled by the first three-dimensional digital tooth models with respect to the patient's intraoral anatomy as defined by the three-dimensional digital anatomic model. For example, it may be checked that the first three-dimensional digital tooth models with the defined sizes and orientation at the defined positions engage in a correct occlusal arrangement with the other teeth surrounding them and/or with antagonistic teeth.

Then, the one or more first three-dimensional digital tooth models may be exchanged with one or more second three-dimensional digital tooth models, e.g., of one or more library teeth of a second tooth library. For example, the one or more second three-dimensional digital tooth models nay be suiting a patient's anatomical requirements better for different reasons.

The one or more second three-dimensional digital tooth models used for replacing the one or more first three-dimensional digital tooth models may, e.g., be automatically aligned with the one or more first three-dimensional digital tooth models to be replaced at the defined positions and with the defined orientations.

Furthermore, dental key structures of the second three-dimensional digital tooth models may be identified and automatically adjusted to match identified dental key structures of the first three-dimensional digital tooth models. Thus, adjustments of dental key structures of the first three-dimensional digital tooth models may be automatically adopted by the second three-dimensional digital tooth models, e.g., resulting in the correct occlusal arrangement implemented for the first three-dimensional digital tooth models.

For example, the arranging of the received one or more first three-dimensional digital tooth models comprises an adjusting of the received one or more first three-dimensional digital tooth models to one or more anatomical conditions of the patient defined by the three-dimensional digital anatomic model.

The adjusting to the one or more anatomical conditions may, e.g., comprise an adjusting of an occlusion. The adjusting to the one or more anatomical conditions may, e.g., comprise an adjusting to a patient's jaw form. For example, a dental arch formed by the first three-dimensional digital tooth models may be adjusted to match an arch form defined by the patient's jaw form.

For example, the adjusting of the received one or more first three-dimensional digital tooth models comprises one or more of the following: scaling sizes of one or more of the received one or more first three-dimensional digital tooth models, deforming one or more of the received one or more first three-dimensional digital tooth models.

In addition to the arranging of the first three-dimensional digital tooth models relative to the three-dimensional digital anatomical model, the three-dimensional digital tooth models, e.g., their shapes, may be adjusting. The adjusting of the first three-dimensional digital tooth models in addition to the arranging may, e.g., comprise a scaling and/or a deforming of the first three-dimensional digital tooth models. A scaling may, e.g., comprise an inflating or a shrinking.

For example, the method further comprises selecting the first set of three-dimensional digital templates for artificial teeth from a plurality of sets of three-dimensional digital templates for artificial teeth.

A plurality of sets of three-dimensional digital templates for artificial teeth may be provided. For example, the sets of three-dimensional digital templates provided are tooth libraries and the three-dimensional digital templates library teeth defined by the tooth libraries.

Thus, the first set of three-dimensional digital templates for artificial teeth may be a first tooth library selected from a plurality of tooth libraries.

For example, the method further comprises selecting the second set of three-dimensional digital templates for artificial teeth from the plurality of sets of three-dimensional digital templates for artificial teeth.

For example, the second set of three-dimensional digital templates for artificial teeth may be a second tooth library selected from the plurality of tooth libraries. For example, the replacing of the first three-dimensional digital tooth models by the second three-dimensional digital tooth models may result in a replacing of the library teeth of the first tooth library by the library teeth of the second tooth library. Examples may enable a switch between different tooth libraries with a quasi-exact tooth aligning and/or fitting. Thus, e.g., a feature label deformation may be provided to best fit a given configuration and by that preserving an existing inter-tooth occlusion and/or a general tooth shape, while at the same time a morphology or characteristic appearance of the library teeth of the second tooth library is maintained.

For example, one or more of the first set of three-dimensional digital templates for artificial teeth and the second set of three-dimensional digital templates for artificial teeth are a tooth library.

Examples may, e.g., enable a switch between different tooth libraries with a quasi-exact tooth aligning and/or fitting. By that, e.g., a quasi-exact inter-tooth occlusion and/or general tooth shape may be preserved by the switching.

For example, one or more of the first set of three-dimensional digital templates for artificial teeth and the second set of three-dimensional digital templates for artificial teeth are a set of three-dimensional digital templates for artificial teeth with the three-dimensional digital tooth models being scans of physical tooth models. The physical tooth models may, e.g., be artificial teeth or natural teeth, which may be used as physical teeth models.

Thus, examples may not be limited to three-dimensional digital tooth models provided in form of library teeth by tooth libraries. Alternatively, the three-dimensional digital tooth models may be provided by scanning and segmenting existing teeth. Existing teeth may, e.g., be existing natural or artificial teeth, which are scanned.

For example, the method further comprises marking one or more dental key structures of the three-dimensional digital tooth models of the set of three-dimensional digital templates for artificial teeth with one or more identifiers identifying the respective one or more dental key structures.

The marking may be implemented manually or automatically. For example, a trained machine learning module may be used for marking dental key structures of three-dimensional digital tooth models with identifiers identifying the respective dental key structures.

For example, a trained machine learning module may be used for marking the one or more dental key structures of the three-dimensional digital tooth models of the set of three-dimensional digital templates for artificial teeth with the one or more identifiers identifying the respective one or more dental key structures. A three-dimensional digital tooth model comprising one or more identifiers identifying one or more dental key structures of the respective three-dimensional digital tooth model may be received as output from the trained machine learning module in response to providing the three-dimensional digital tooth model as input to the trained machine learning module.

The trained machine learning module may be trained to provide the three-dimensional digital tooth model with the one or more identifiers as output in response to receiving the three-dimensional digital tooth model as input.

For example, a providing of the trained machine learning module may comprise providing a machine learning module to be trained. Training datasets may be provided for training the machine learning module to be trained. For example, each training dataset may comprise a three-dimensional digital training tooth model without identifiers as well as a three-dimensional digital training tooth model with identifiers. The machine learning module to be trained may be trained to provide the three-dimensional digital training tooth models with identifiers of the training datasets as an output in response to receiving the three-dimensional digital training tooth models without identifiers of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding having to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet.

A pre-trained or partially machine learning module may, e.g., be import and trained to be used for the purposes disclosed herein.

The term "machine learning" (ML) refers to a computer algorithm used to extract useful information from training data sets by building probabilistic models, which are referred to as machine learning modules or models, in an automated way. A machine learning module may also be referred to as a predictive model.

Machine learning algorithms build a mathematical model based on sample data, known as "training data", in order to make predictions or decisions without being explicitly programmed to perform the task. The machine learning module may be performed using a learning algorithm such as supervised or unsupervised learning. The machine learning module may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a three-dimensional digital training tooth model with identifiers as output by the trained machine learning module. The trained machine learning module may predict the unmeasured value from other, known values, e.g., a three-dimensional digital training tooth model without identifiers as input.

According to an example, the machine learning module may comprise a deep learning model.

For example, the method further comprises scanning physical tooth models and generating the set of three-dimensional digital templates for artificial teeth.

The scanning may, e.g., comprise an optical scanning of the physical tooth models. For example, an optical scanner may be used for scanning the physical tooth models. The physical tooth models may, e.g., be provided in form of artificial teeth, which are scanned. The artificial teeth may, e.g., be provided as single teeth. The artificial teeth may, e.g., be provided as a set of teeth, e.g., as a bridge or as a denture. The scanning of the physical tooth models may, e.g., further comprise a segmenting of the scanned artificial teeth.

The physical tooth models may, e.g., be provided in form of natural teeth, which are scanned. For example, natural teeth may be scanned directly in a patient's oral cavity, i.e., using an intraoral scan. Alternatively or additionally, an indirect scan of the natural teeth may be used to acquire the scan data of the natural teeth, i.e., scanning the natural teeth. For example, an impression of the natural teeth or a model of the respective natural teeth, like a plaster model, may be scanned.

Generating the three-dimensional digital templates may, e.g., comprise applying an artificial abrasion to the templates.

For example, the three-dimensional digital anatomic model comprises one or more of the following: one or more three-dimensional digital maxillary anatomic structures of the patient, one or more three-dimensional digital mandibular anatomic structures of the patient.

The maxillary anatomic structures may, e.g., comprise soft and/or hard oral tissue of the patient maxilla. The mandibular anatomic structures may, e.g., comprise soft and/or hard oral tissue of the patient mandible.

For example, the method further comprises acquiring scan of a patient's intraoral anatomical state, e.g., using an intraoral scanner. For example, the method further comprises generating the three-dimensional digital anatomic model using the acquired scan data.

The patient may, e.g., be edentulous. In this case, the scan data may be scan data of one or more edentulous jaws of the patient, i.e., of the patient's gingiva and the form of the patient's jaw bones. In case the patient's dentition comprise one or more teeth, the scan data may in addition comprise scan data being descriptive of the position and form the teeth in the patient's oral cavity. For example, the teeth comprised by the scan data may be segmented. For example, one or more of the segmented teeth may be replace by on of the first three-dimensional digital tooth models. The scan data of the current dentition state of the patient may be acquired using a scanner, e.g., an optical scanner. The scan may be a direct scan of the patient's oral cavity, i.e., an intraoral scan. Alternatively or additionally, an indirect scan of the oral cavity may be used to acquire the scan data. For example, an impression of the patient's soft and hard oral tissue or a model of the respective oral tissue, like a plaster model, may be scanned.

For example, the first set of three-dimensional digital templates for artificial teeth and the second set of three-dimensional digital templates for artificial teeth comprise one or more of the following: one or more three-dimensional digital models of one or more maxillary teeth, one or more three-dimensional digital models of one or more mandibular teeth.

For example, the first set of three-dimensional digital templates for artificial teeth comprises three-dimensional digital models of a partial dental arch. For example, the first set of three-dimensional digital templates for artificial teeth comprises three-dimensional digital models of a complete dental arch.

For example, the second set of three-dimensional digital templates for artificial teeth comprises three-dimensional digital models of a partial dental arch. For example, the second set of three-dimensional digital templates for artificial teeth comprises three-dimensional digital models of a complete dental arch.

For example, the method further comprises providing data for controlling a manufacturing of one or more artificial teeth. The control data define the adjusted one or more second three-dimensional digital tooth models as one or more templates for the one or more artificial teeth.

For example, the method further comprises controlling the manufacturing of one or more artificial teeth using the data provided for controlling the manufacturing. The manufactured one or more artificial teeth are one or more physical copies of the one or more templates defined by the provided data.

For manufacturing the one or more artificial teeth, e.g., computer-controlled additive and/subtractive methods may be used. For example, the one or more artificial teeth may be manufactured using at least one of the following: machining, three-dimensional printing.

For example, the one or more artificial teeth may be manufactured using a machining device configured to manufacture the one or more artificial teeth by processing one or more blanks. For example, the one or more artificial teeth may be manufactured using a 3D printing device, i.e., a printer, configured to print the respective one or more artificial teeth.

In another aspect a computer program product is disclosed for replacing one or more first three-dimensional digital tooth models of a first set of three-dimensional digital templates for artificial teeth by one or more second three-dimensional digital tooth models of a second set of three-dimensional digital templates for artificial teeth. The computer program product comprises a non-transitory computer readable storage medium having program instructions embodied therewith. The program instructions are executable by a processor of a computer device to cause the computer device to receive a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures. One or more first three-dimensional digital tooth models of the one or more arranged first three-dimensional digital tooth models are selected for a replacement. The selected one or more first three-dimensional digital tooth models are replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures.

The replacing comprises arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models. The one or more dental key structures of the selected one or more first three-dimensional digital tooth models are identified using the one or more first identifiers. The one or more dental key structures of the arranged one or more second three-dimensional digital tooth models are identified using the one or more second identifiers. One or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

The program instructions provided by the computer program product may, e.g., be executable by the processor of the computer device to cause the computer device to execute any of the aforementioned examples of the method for replacing one or more first three-dimensional digital tooth models of a first set of three-dimensional digital templates for artificial teeth by one or more second three-dimensional digital tooth models of a second set of three-dimensional digital templates for artificial teeth.

In another aspect a computer program is disclosed for replacing one or more first three-dimensional digital tooth models of a first set of three-dimensional digital templates for artificial teeth by one or more second three-dimensional digital tooth models of a second set of three-dimensional digital templates for artificial teeth. The computer program comprises program instructions, which are executable by a processor of a computer device to cause the computer device to receive a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures. One or more first three-dimensional digital tooth models of the one or more arranged first three-dimensional digital tooth models are selected for a replacement. The selected one or more first three-dimensional digital tooth models are replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures.

The replacing comprises arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models. The one or more dental key structures of the selected one or more first three-dimensional digital tooth models are identified using the one or more first identifiers. The one or more dental key structures of the arranged one or more second three-dimensional digital tooth models are identified using the one or more second identifiers. One or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

The program instructions comprised by the computer program may, e.g., be executable by the processor of the computer device to cause the computer device to execute any of the aforementioned examples of the method for replacing one or more first three-dimensional digital tooth models of a first set of three-dimensional digital templates for artificial teeth by one or more second three-dimensional digital tooth models of a second set of three-dimensional digital templates for artificial teeth.

In another aspect a computer device is disclosed for replacing one or more first three-dimensional digital tooth models of a first set of three-dimensional digital templates for artificial teeth by one or more second three-dimensional digital tooth models of a second set of three-dimensional digital templates for artificial teeth. The computer device comprises a processor and a memory storing program instructions executable by the processor. Execution of the program instructions by the processor causes the computer device to receive a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures. One or more first three-dimensional digital tooth models of the one or more arranged first three-dimensional digital tooth models are selected for a replacement. The selected one or more first three-dimensional digital tooth models are replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures.

The replacing comprises arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models. The one or more dental key structures of the selected one or more first three-dimensional digital tooth models are identified using the one or more first identifiers. The one or more dental key structures of the arranged one or more second three-dimensional digital tooth models are identified using the one or more second identifiers. One or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

Execution of the program instructions by the processor of the computer device may, e.g., cause the computer device to execute any of the aforementioned examples of the method for replacing one or more first three-dimensional digital tooth models of a first set of three-dimensional digital templates for artificial teeth by one or more second three-dimensional digital tooth models of a second set of three-dimensional digital templates for artificial teeth.

For example, the computer device is comprised by a manufacturing system. The manufacturing system further comprises one or more manufacturing devices configured to manufacture one or more artificial teeth. Execution of the program instructions by the processor further causes the computer device to provide data for controlling the manufacturing of the one or more artificial teeth. The control data defines the adjusted one or more second three-dimensional digital tooth models as one or more templates for the one or more artificial teeth. The one or more manufacturing devices are controlled to manufacture the artificial teeth using the data provided for controlling the manufacturing with the one or more artificial teeth manufactured being physical copies of the adjusted one or more second three-dimensional digital tooth models.

For the manufacturing of the artificial teeth, e.g., computer-controlled additive and/or subtractive methods may be used. For example, the artificial teeth may be manufactured using one of the following: machining, 3D printing.

For example, the one or more manufacturing devices of the manufacturing system may comprise one or more of the following: a machining device, a 3D printing device.

It is understood that one or more of the above-described embodiments may be combined as long as the combined embodiments are not mutually exclusive.

BRIEF DESCRIPTION OF THE DRAWINGS

In the following, examples are described in greater detail making reference to the drawings in which:

FIG. 4 is a flow diagram of a further exemplary method for replacing three-dimensional digital tooth models.

DETAILED DESCRIPTION

Figure 1:
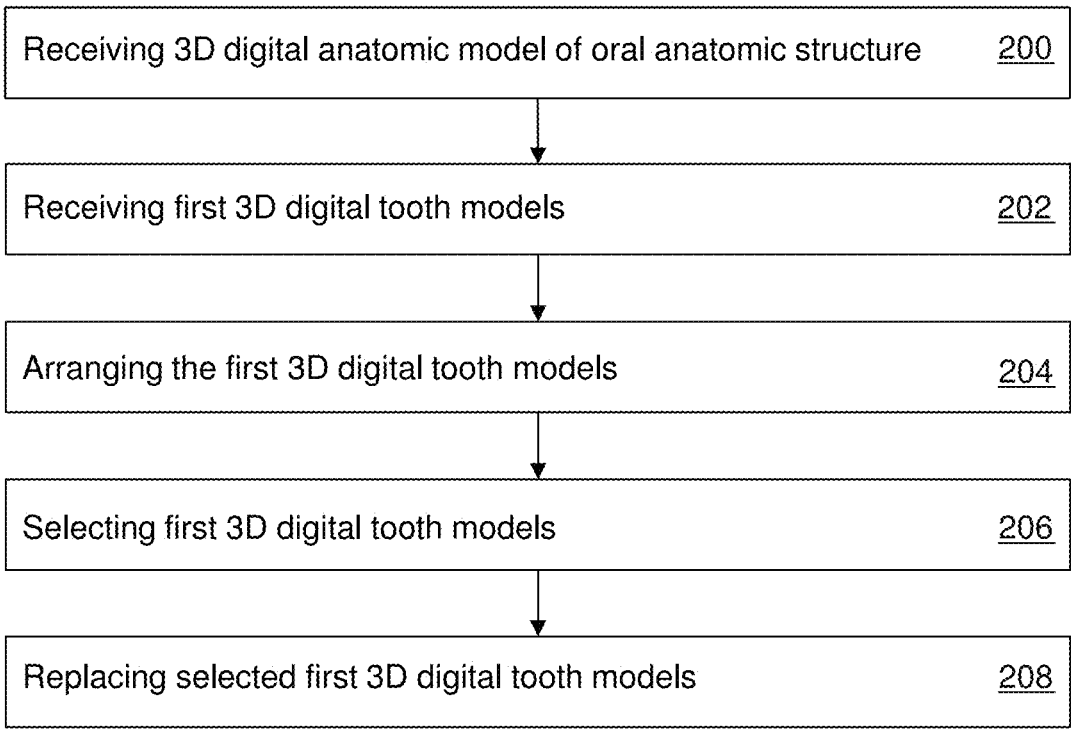
FIG. 1 is a flow diagram of an exemplary for method for replacing three-dimensional digital tooth models.

In the following, similar elements are denoted by the same reference numerals.

FIG. 1 is an exemplary method for replacing one or more first three-dimensional digital tooth models of a first set of three-dimensional digital templates for artificial teeth by one or more three-dimensional digital tooth models of a second set of three-dimensional digital templates for artificial teeth. In block 200, a three-dimensional digital anatomic model of an oral anatomic structure of a patient is received. The three-dimensional digital anatomic model may, e.g., comprise one or more three-dimensional digital maxillary anatomic structures of the patient. The three-dimensional digital anatomic model may, e.g., comprise one or more three-dimensional digital mandibular anatomic structures of the patient.

In block 202, the one or more first three-dimensional digital tooth models of the first set of three-dimensional digital templates for artificial teeth are received. The first set of three-dimensional digital templates for artificial teeth may, e.g., be a tooth library. The first set of three-dimensional digital templates for artificial teeth may, e.g., be a set of three-dimensional digital templates with first three-dimensional digital tooth models, which are scans of physical tooth models. The one or more first three-dimensional digital tooth models may, e.g., be received before, after, or together with the three-dimensional digital anatomic model. In block 204, the one or more first three-dimensional digital tooth models are arranged with respect to the three-dimensional digital anatomic model at one or more tooth positions with one or more tooth orientations. The arranging of the received one or more first three-dimensional digital tooth models may, e.g., comprise an adjusting of the received one or more first three-dimensional digital tooth models to one or more anatomical conditions of the patient defined by the three-dimensional digital anatomic model. The adjusting of the received one or more first three-dimensional digital tooth models may, e.g., comprise one or more of the following: scaling sizes of one or more of the received one or more first three-dimensional digital tooth models, deforming one or more of the received one or more first three-dimensional digital tooth models.

The first set of three-dimensional digital templates for artificial teeth may, e.g., comprise one or more first three-dimensional digital models of one or more maxillary teeth. The first set of three-dimensional digital templates for artificial teeth may, e.g., comprise one or more first three-dimensional digital models of one or more mandibular teeth. For example, the receiving of the one or more first three-dimensional digital tooth models comprises selecting the one or more first three-dimensional digital tooth models from the first set of three-dimensional digital templates for artificial teeth. For example, the receiving of the one or more first three-dimensional digital tooth models comprises selecting the first set of three-dimensional digital templates for artificial teeth with the one or more first three-dimensional digital tooth models from a plurality of sets of three-dimensional digital templates for artificial teeth.

The one or more first three-dimensional digital tooth models comprise one or more dental key structures marked with one or more first identifiers identifying the one or more dental key structures, i.e., the one or more first identifiers may, e.g., identify one or more first dental key structures of the one or more first three-dimensional digital tooth models. The one or more dental key structures of the one or more first three-dimensional digital tooth models may, e.g., comprise one or more of the following: one or more occlusal contact patches of the one or more first three-dimensional digital tooth models, one or more occlusal approximal contact patches of the one or more first three-dimensional digital tooth models, one or more cervical boundary lines of the one or more first three-dimensional digital tooth models, one or more equatorial lines of the one or more first three-dimensional digital tooth models, one or more chewing surfaces of the one or more first three-dimensional digital tooth models, one or more cusps of the one or more first three-dimensional digital tooth models, one or more fissures of the one or more first three-dimensional digital tooth models, one or more incisal edges of the one or more first three-dimensional digital tooth models.

For example, the one or more dental key structures of the one or more first three-dimensional digital tooth models being received are already marked with the one or more first identifiers identifying the one or more dental key structures. Alternatively, the method may, e.g., further comprises marking the one or more dental key structures of the received one or more first three-dimensional digital tooth models with the first identifiers.

In block 206, one or more first three-dimensional digital tooth models of the one or more arranged first three-dimensional digital tooth models are selected for a replacement. In block 208, the selected one or more first three-dimensional digital tooth models are replaced by the one or more second three-dimensional digital tooth models of the second set of three-dimensional digital templates for artificial teeth. The second set of three-dimensional digital templates for artificial teeth may, e.g., be a tooth library. The second set of three-dimensional digital templates for artificial teeth may, e.g., be a set of three-dimensional digital templates with second three-dimensional digital tooth models, which are scans of physical tooth models.

The second set of three-dimensional digital templates for artificial teeth may, e.g., comprise one or more second three-dimensional digital models of one or more maxillary teeth. The second set of three-dimensional digital templates for artificial teeth may, e.g., comprise one or more second three-dimensional digital models of one or more mandibular teeth. For example, the one or more second three-dimensional digital tooth models used for replacing the selected one or more first three-dimensional digital tooth models are selected from the second set of three-dimensional digital templates for artificial teeth. For example, the second set of three-dimensional digital templates for artificial teeth is selected from the plurality of sets of three-dimensional digital templates for artificial teeth.

The one or more second three-dimensional digital tooth models comprise one or more dental key structures marked with one or more second identifiers identifying the one or more dental key structures, i.e., the one or more second identifiers may, e.g., identify one or more second dental key structures of the one or more second three-dimensional digital tooth models. The one or more dental key structures of the one or more second three-dimensional digital tooth models may, e.g., comprise one or more of the following: one or more occlusal contact patches of the one or more second three-dimensional digital tooth models, one or more approximal contact patches of the one or more second three-dimensional digital tooth models, one or more cervical boundary lines of the one or more second three-dimensional digital tooth models, one or more equatorial lines of the one or more second three-dimensional digital tooth models, one or more chewing surfaces of the one or more second three-dimensional digital tooth models, one or more cusps of the one or more second three-dimensional digital tooth models, one or more fissures of the one or more second three-dimensional digital tooth models, one or more incisal edges of the one or more second three-dimensional digital tooth models.

For example, the one or more dental key structures of the one or more second three-dimensional digital tooth models used for replacing the selected one or more first three-dimensional digital tooth models are already marked with the one or more second identifiers identifying the one or more second dental key structure. Alternatively, the method may, e.g., further comprises marking the one or more dental key structures of the one or more second three-dimensional digital tooth models used for replacing the selected one or more first three-dimensional digital tooth models with the second identifiers.

Figure 2:
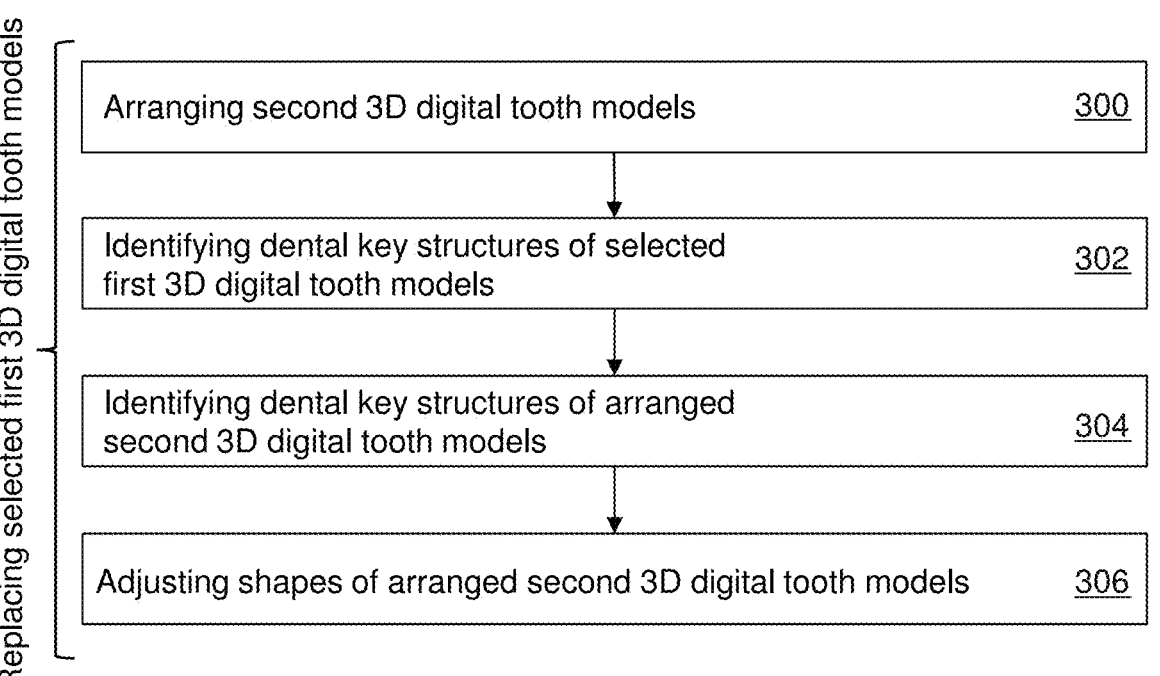
FIG. 2 is a flow diagram illustrating in more detail the replacing of FIG. 1.

FIG. 2 is shows in more detail the replacing of the selected one or more first three-dimensional digital tooth models by the one or more second three-dimensional digital tooth models of the second set of three-dimensional digital templates for artificial teeth in block 208 of FIG. 1.

In block 300, the one or more second three-dimensional digital tooth models are arranged with respect to the three-dimensional digital anatomic model at the one or more tooth positions of the selected one or more first three-dimensional digital tooth models and with the one or more tooth orientations of the selected one or more first three-dimensional digital tooth models. The arranging of the one or more second three-dimensional digital tooth models may, e.g., additionally comprise scaling sizes of one or more of the second three-dimensional digital tooth models.

In block 302, the one or more dental key structures of the selected one or more first three-dimensional digital tooth models are identified using the one or more first identifiers. In block 304, the one or more dental key structures of the arranged one or more second three-dimensional digital tooth models are identified using the one or more second identifiers. The one or more dental key structures of the arranged one or more second three-dimensional digital tooth models may, e.g., be identified before, after, or together with the one or more dental key structures of the selected one or more first three-dimensional digital tooth models. In block 306, one or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

The adjusting of the one or more shapes of the arranged one or more second three-dimensional digital tooth models may, e.g., comprise applying one or more adjustments to one or more sections of the one or more shapes comprising the identified one or more dental key structures. The applied adjustments may, e.g., comprise one or more of the following adjustments: a translation, a rotation, a scaling, a deformation. While adjusting the sections of the one or more second three-dimensional digital tooth models comprising the identified one or more dental key structures, e.g., positions, orientations, sizes, and shapes of remaining sections of the one or more shapes of the one or more second three-dimensional digital tooth models may be maintained.

Figure 3:
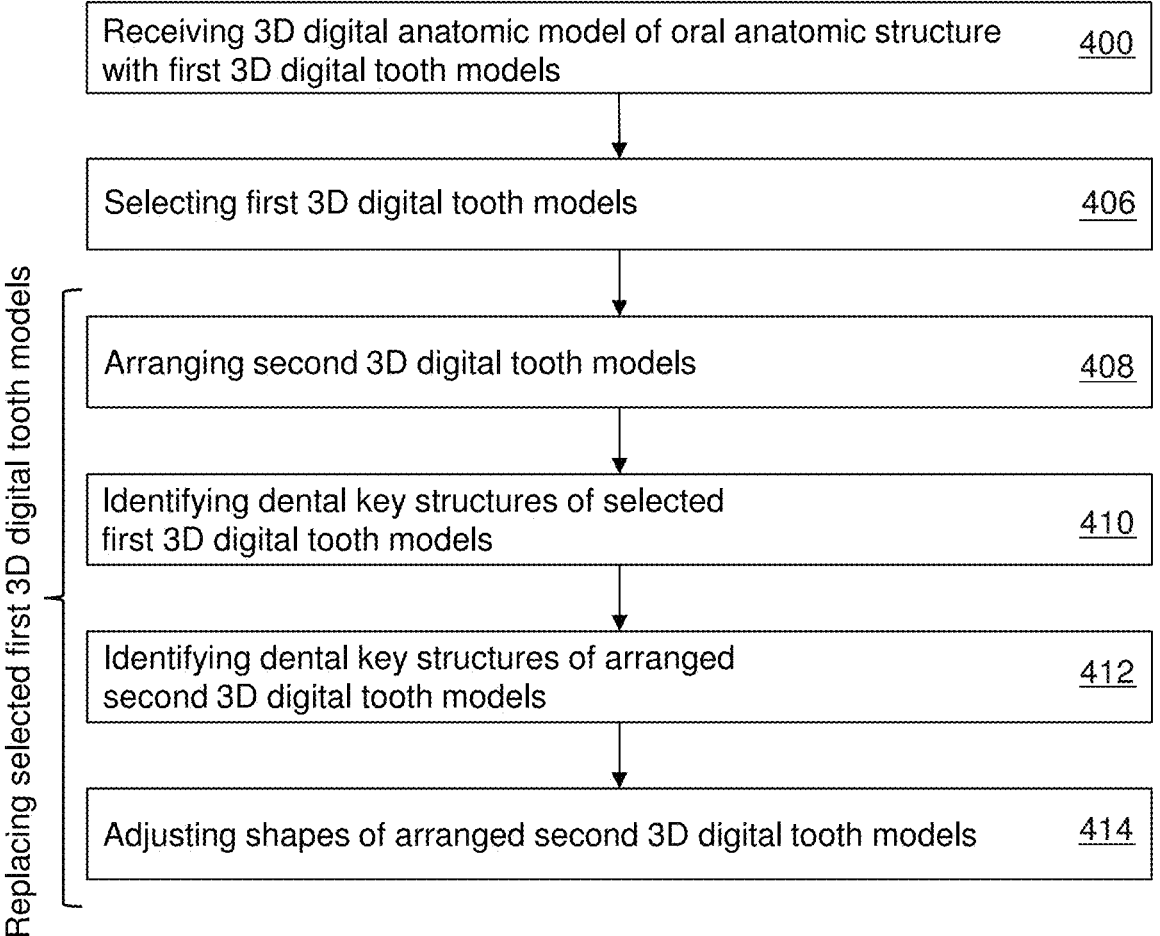
FIG. 3 is a flow diagram of a further exemplary method for replacing three-dimensional digital tooth models.

FIG. 3 shows a further exemplary method for replacing one or more first three-dimensional digital tooth models of a first set of three-dimensional digital templates for artificial teeth by one or more second three-dimensional digital tooth models of a second set of three-dimensional digital templates for artificial teeth. In block 400, a three-dimensional digital anatomic model of an oral anatomic structure of a patient is received as well as the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures, i.e., the one or more first identifiers may, e.g., identify one or more first dental key structures of the one or more first three-dimensional digital tooth models. The one or more dental key structures of the one or more first three-dimensional digital tooth models may, e.g., comprise one or more of the following: one or more occlusal contact patches of the one or more first three-dimensional digital tooth models, one or more approximal contact patches of the one or more first three-dimensional digital tooth models, one or more cervical boundary lines of the one or more first three-dimensional digital tooth models, one or more equatorial lines of the one or more first three-dimensional digital tooth models, one or more chewing surfaces of the one or more first three-dimensional digital tooth models, one or more cusps of the one or more first three-dimensional digital tooth models, one or more fissures of the one or more first three-dimensional digital tooth models, one or more incisal edges of the one or more first three-dimensional digital tooth models.

For example, the one or more dental key structures of the one or more first three-dimensional digital tooth models being received are already marked with the one or more first identifiers identifying the one or more dental key structures. Alternatively, the method may, e.g., further comprises marking the one or more dental key structures of the received one or more first three-dimensional digital tooth models with the first identifiers.

The three-dimensional digital anatomic model may, e.g., comprise one or more three-dimensional digital maxillary anatomic structures of the patient. The three-dimensional digital anatomic model may, e.g., comprise one or more three-dimensional digital mandibular anatomic structures of the patient. The first set of three-dimensional digital templates for artificial teeth may, e.g., be a tooth library. The first set of three-dimensional digital templates for artificial teeth may, e.g., be a set of three-dimensional digital templates with first three-dimensional digital tooth models, which are scans of physical tooth models.

The first set of three-dimensional digital templates for artificial teeth may, e.g., comprise one or more first three-dimensional digital models of one or more maxillary teeth. The first set of three-dimensional digital templates for artificial teeth may, e.g., comprise one or more first three-dimensional digital models of one or more mandibular teeth.

In block 406, one or more first three-dimensional digital tooth models of the one or more arranged first three-dimensional digital tooth models are selected for a replacement. The selected one or more first three-dimensional digital tooth models are to be replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures, i.e., the one or more second identifiers may, e.g., identify one or more second dental key structures of the one or more second three-dimensional digital tooth models. The one or more dental key structures of the one or more second three-dimensional digital tooth models may, e.g., comprise one or more of the following: one or more occlusal contact patches of the one or more second three-dimensional digital tooth models, one or more approximal contact patches of the one or more second three-dimensional digital tooth models, one or more cervical boundary lines of the one or more second three-dimensional digital tooth models, one or more equatorial lines of the one or more second three-dimensional digital tooth models, one or more chewing surfaces of the one or more second three-dimensional digital tooth models, one or more cusps of the one or more second three-dimensional digital tooth models, one or more fissures of the one or more second three-dimensional digital tooth models, one or more incisal edges of the one or more second three-dimensional digital tooth models.

For example, the one or more dental key structures of the one or more second three-dimensional digital tooth models used for replacing the selected one or more first three-dimensional digital tooth models are already marked with the one or more second identifiers identifying the one or more second dental key structure. Alternatively, the method may, e.g., further comprises marking the one or more dental key structures of the one or more second three-dimensional digital tooth models used for replacing the selected one or more first three-dimensional digital tooth models with the second identifiers.

The second set of three-dimensional digital templates for artificial teeth may, e.g., be a tooth library. The second set of three-dimensional digital templates for artificial teeth may, e.g., be a set of three-dimensional digital templates with second three-dimensional digital tooth models, which are scans of physical tooth models.

The second set of three-dimensional digital templates for artificial teeth may, e.g., comprise one or more second three-dimensional digital models of one or more maxillary teeth. The second set of three-dimensional digital templates for artificial teeth may, e.g., comprise one or more second three-dimensional digital models of one or more mandibular teeth. For example, the one or more second three-dimensional digital tooth models used for replacing the selected one or more first three-dimensional digital tooth models are selected from the second set of three-dimensional digital templates for artificial teeth. For example, the second set of three-dimensional digital templates for artificial teeth is selected from the plurality of sets of three-dimensional digital templates for artificial teeth.

In block 408, the one or more second three-dimensional digital tooth models are arranged with respect to the three-dimensional digital anatomic model at the one or more tooth positions of the selected one or more first three-dimensional digital tooth models and with the one or more tooth orientations of the selected one or more first three-dimensional digital tooth models. The arranging of the one or more second three-dimensional digital tooth models may, e.g., additionally comprise scaling sizes of one or more of the second three-dimensional digital tooth models.

In block 410, the one or more dental key structures of the selected one or more first three-dimensional digital tooth models are identified using the one or more first identifiers. In block 412, the one or more dental key structures of the arranged one or more second three-dimensional digital tooth models are identified using the one or more second identifiers. The one or more dental key structures of the arranged one or more second three-dimensional digital tooth models may, e.g., be identified before, after, or together with the one or more dental key structures of the selected one or more first three-dimensional digital tooth models. In block 414, one or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

The adjusting of the one or more shapes of the arranged one or more second three-dimensional digital tooth models may, e.g., comprise applying one or more adjustments to one or more sections of the one or more shapes comprising the identified one or more dental key structures. The applied adjustments may, e.g., comprise one or more of the following adjustments: a translation, a rotation, a scaling, a deformation. While adjusting the sections of the one or more second three-dimensional digital tooth models comprising the identified one or more dental key structures, e.g., positions, orientations, sizes, and shapes of remaining sections of the one or more shapes of the one or more second three-dimensional digital tooth models may be maintained.

FIG. 4 shows a further exemplary method for replacing one or more first three-dimensional digital tooth models of a first set of three-dimensional digital templates for artificial teeth by one or more second three-dimensional digital tooth models of a second set of three-dimensional digital templates for artificial teeth. Blocks 400 to 414 of FIG. 4 may be identical to blocks 400 to 414 of FIG. 3. In block 400, a three-dimensional digital anatomic model of an oral anatomic structure of a patient is received as well as the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures, i.e., the one or more first identifiers may, e.g., identify one or more first dental key structures of the one or more first three-dimensional digital tooth models. The one or more dental key structures of the one or more first three-dimensional digital tooth models may, e.g., comprise one or more of the following: one or more occlusal contact patches of the one or more first three-dimensional digital tooth models, one or more approximal contact patches of the one or more first three-dimensional digital tooth models, one or more cervical boundary lines of the one or more first three-dimensional digital tooth models, one or more equatorial lines of the one or more first three-dimensional digital tooth models, one or more chewing surfaces of the one or more first three-dimensional digital tooth models, one or more cusps of the one or more first three-dimensional digital tooth models, one or more fissures of the one or more first three-dimensional digital tooth models, one or more incisal edges of the one or more first three-dimensional digital tooth models.

For example, the one or more dental key structures of the one or more first three-dimensional digital tooth models being received are already marked with the one or more first identifiers identifying the one or more dental key structures. Alternatively, the method may, e.g., further comprises marking the one or more dental key structures of the received one or more first three-dimensional digital tooth models with the first identifiers.

The three-dimensional digital anatomic model may, e.g., comprise one or more three-dimensional digital maxillary anatomic structures of the patient. The three-dimensional digital anatomic model may, e.g., comprise one or more three-dimensional digital mandibular anatomic structures of the patient. The first set of three-dimensional digital templates for artificial teeth may, e.g., be a tooth library. The first set of three-dimensional digital templates for artificial teeth may, e.g., be a set of three-dimensional digital templates with first three-dimensional digital tooth models, which are scans of physical tooth models.

The first set of three-dimensional digital templates for artificial teeth may, e.g., comprise one or more first three-dimensional digital models of one or more maxillary teeth. The first set of three-dimensional digital templates for artificial teeth may, e.g., comprise one or more first three-dimensional digital models of one or more mandibular teeth.

In block 406, one or more first three-dimensional digital tooth models of the one or more arranged first three-dimensional digital tooth models are selected for a replacement. The selected one or more first three-dimensional digital tooth models are to be replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures, i.e., the one or more second identifiers may, e.g., identify one or more second dental key structures of the one or more second three-dimensional digital tooth models. The one or more dental key structures of the one or more second three-dimensional digital tooth models may, e.g., comprise one or more of the following: one or more occlusal contact patches of the one or more second three-dimensional digital tooth models, one or more approximal contact patches of the one or more second three-dimensional digital tooth models, one or more cervical boundary lines of the one or more second three-dimensional digital tooth models, one or more equatorial lines of the one or more second three-dimensional digital tooth models, one or more chewing surfaces of the one or more second three-dimensional digital tooth models, one or more cusps of the one or more second three-dimensional digital tooth models, one or more fissures of the one or more second three-dimensional digital tooth models, one or more incisal edges of the one or more second three-dimensional digital tooth models.

For example, the one or more dental key structures of the one or more second three-dimensional digital tooth models used for replacing the selected one or more first three-dimensional digital tooth models are already marked with the one or more second identifiers identifying the one or more second dental key structure. Alternatively, the method may, e.g., further comprises marking the one or more dental key structures of the one or more second three-dimensional digital tooth models used for replacing the selected one or more first three-dimensional digital tooth models with the second identifiers.

The second set of three-dimensional digital templates for artificial teeth may, e.g., be a tooth library. The second set of three-dimensional digital templates for artificial teeth may, e.g., be a set of three-dimensional digital templates with second three-dimensional digital tooth models, which are scans of physical tooth models.

The second set of three-dimensional digital templates for artificial teeth may, e.g., comprise one or more second three-dimensional digital models of one or more maxillary teeth. The second set of three-dimensional digital templates for artificial teeth may, e.g., comprise one or more second three-dimensional digital models of one or more mandibular teeth. For example, the one or more second three-dimensional digital tooth models used for replacing the selected one or more first three-dimensional digital tooth models are selected from the second set of three-dimensional digital templates for artificial teeth. For example, the second set of three-dimensional digital templates for artificial teeth is selected from the plurality of sets of three-dimensional digital templates for artificial teeth.

In block 408, the one or more second three-dimensional digital tooth models are arranged with respect to the three-dimensional digital anatomic model at the one or more tooth positions of the selected one or more first three-dimensional digital tooth models and with the one or more tooth orientations of the selected one or more first three-dimensional digital tooth models. The arranging of the one or more second three-dimensional digital tooth models may, e.g., additionally comprise scaling sizes of one or more of the second three-dimensional digital tooth models.

In block 410, the one or more dental key structures of the selected one or more first three-dimensional digital tooth models are identified using the one or more first identifiers. In block 412, the one or more dental key structures of the arranged one or more second three-dimensional digital tooth models are identified using the one or more second identifiers. The one or more dental key structures of the arranged one or more second three-dimensional digital tooth models may, e.g., be identified before, after, or together with the one or more dental key structures of the selected one or more first three-dimensional digital tooth models. In block 414, one or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

The adjusting of the one or more shapes of the arranged one or more second three-dimensional digital tooth models may, e.g., comprise applying one or more adjustments to one or more sections of the one or more shapes comprising the identified one or more dental key structures. The applied adjustments may, e.g., comprise one or more of the following adjustments: a translation, a rotation, a scaling, a deformation. While adjusting the sections of the one or more second three-dimensional digital tooth models comprising the identified one or more dental key structures, e.g., positions, orientations, sizes, and shapes of remaining sections of the one or more shapes of the one or more second three-dimensional digital tooth models may be maintained.

In block 416, data for controlling a manufacturing of one or more artificial teeth is provided. The control data define the adjusted one or more second three-dimensional digital tooth models as one or more templates for the one or more artificial teeth. In block 418, one or more artificial teeth are manufactured using the data provided for controlling the manufacturing. The manufactured one or more artificial teeth are one or more physical copies of the one or more templates defined by the provided data.

Figure 5:
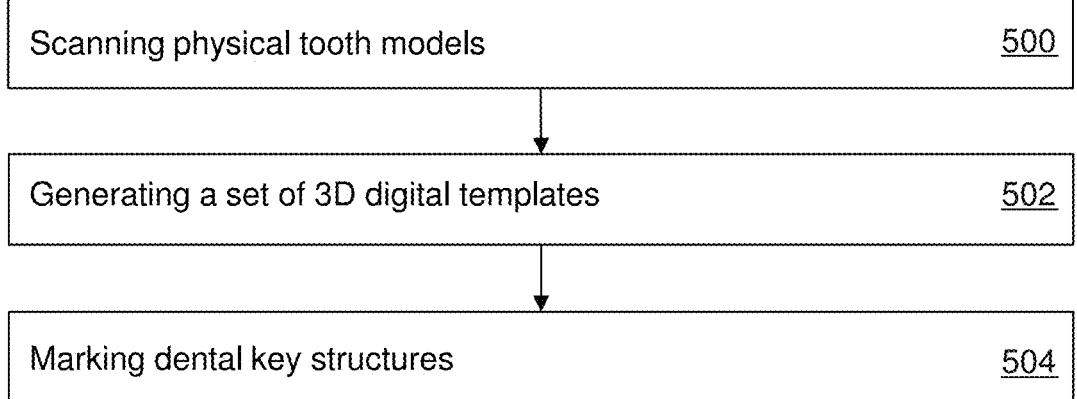
FIG. 5 is a flow diagram of an exemplary method for providing three-dimensional digital tooth models with marked dental key structures.

FIG. 5 shows a method for providing three-dimensional digital tooth models with marked dental key structures, like the one or more first three-dimensional digital tooth models for artificial teeth and/or the second three-dimensional digital tooth models of FIG. 1 to 4. In block 500, physical tooth models are scanned. In block 502, a set of three-dimensional digital templates for artificial teeth is generated. The set of three-dimensional digital templates comprises the three-dimensional digital tooth models, e.g., the one or more first three-dimensional digital tooth models for artificial teeth or the second three-dimensional digital tooth models. The three-dimensional digital tooth models are generated using scan data acquired by scanning the physical tooth models. In block 504, one or more dental key structures of the three-dimensional digital tooth models of the set of three-dimensional digital templates for artificial teeth are marked with one or more identifiers identifying the respective one or more dental key structures. The one or more dental key structures being marked may, e.g., comprise one or more of the following: occlusal contact patches, approximal contact patches, cervical boundary lines, equatorial lines, chewing surfaces, cusps, fissures, incisal edges.

Figures 6, 7:
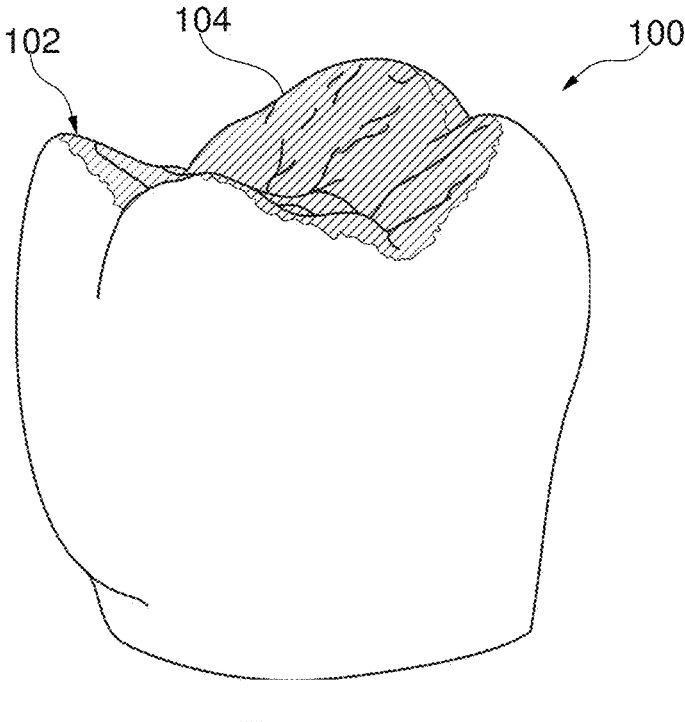
FIG. 6 shows an exemplary three-dimensional digital tooth model with a dental key structure in form of a chewing surface of the three-dimensional digital tooth model.
FIG. 7 shows the three-dimensional digital tooth model of FIG. 6.

FIG. 6 shows an exemplary three-dimensional digital tooth model 100 of a molar, e.g., a first three-dimensional digital tooth model of a first set of three-dimensional digital templates for artificial teeth or a second three-dimensional digital tooth models of a second set of three-dimensional digital templates for artificial teeth. A dental key structure 102 in form of a chewing surface of the three-dimensional digital tooth model 100 is highlighted. The dental key structure 102 is, e.g., a first dental key structure of a first three-dimensional digital tooth model of a first set of three-dimensional digital templates for artificial teeth. The dental key structure 102 is, e.g., a second dental key structure of a second three-dimensional digital tooth model of a second set of three-dimensional digital templates for artificial teeth. For example, the dental key structure 102 of the three-dimensional digital tooth model 100 is marked with an identifier 104 identifying the dental key structure 102. The identifier 104 is, e.g., a first identifier identifying a first dental key structure of a first three-dimensional digital tooth model. The identifier 104 is, e.g., a second identifier identifying a second dental key structure of a second three-dimensional digital tooth model. For example, a dataset defining the three-dimensional digital tooth model 100 comprises the identifier 104 identifying those sections of the three-dimensional digital tooth model 100 defined by the dataset, which are part of the dental key structure 102.

The three-dimensional digital tooth model 100 in FIG. 6 is shown from a lateral perspective. In FIG. 7, the three-dimensional digital tooth model 100 of FIG. 6 is shown from another perspective, i.e., an occlusal perspective.

Figure 8:
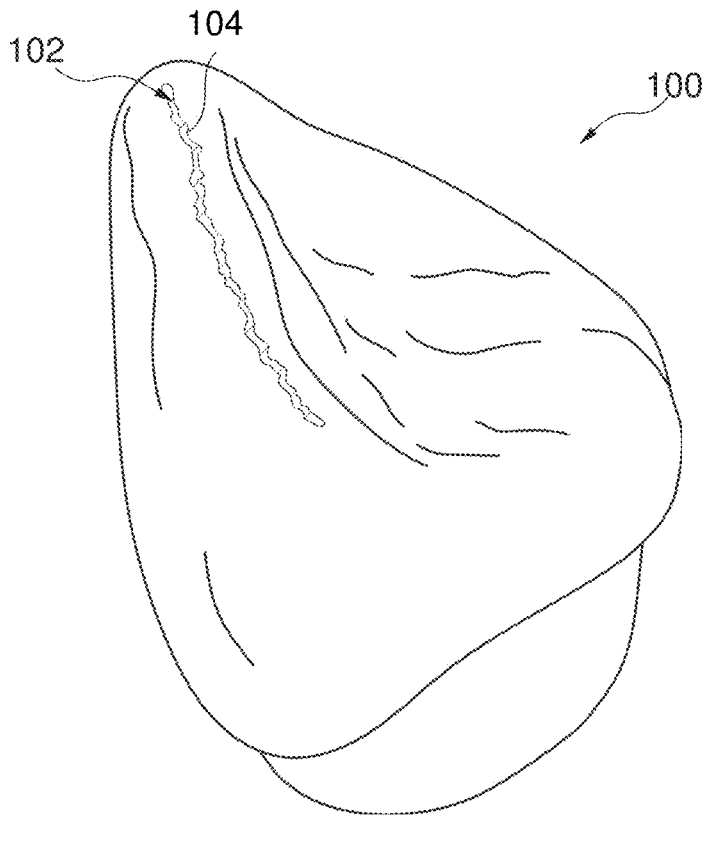
FIG. 8 shows a further exemplary three-dimensional digital tooth model with a dental key structure in form of an incisal edge of the three-dimensional digital tooth model.

FIG. 8 shows an exemplary three-dimensional digital tooth model 100 of an incisor, e.g., a first three-dimensional digital tooth model of a first set of three-dimensional digital templates for artificial teeth or a second three-dimensional digital tooth models of a second set of three-dimensional digital templates for artificial teeth. A dental key structure 102 in form of an incisal edge of the three-dimensional digital tooth model 100 is highlighted. The dental key structure 102 is, e.g., a first dental key structure of a first three-dimensional digital tooth model of a first set of three-dimensional digital templates for artificial teeth. The dental key structure 102 is, e.g., a second dental key structure of a second three-dimensional digital tooth model of a second set of three-dimensional digital templates for artificial teeth. For example, the dental key structure 102 of the three-dimensional digital tooth model 100 is marked with an identifier 104 identifying the dental key structure 102. The identifier 104 is, e.g., a first identifier identifying a first dental key structure of a first three-dimensional digital tooth model. The identifier 104 is, e.g., a second identifier identifying a second dental key structure of a second three-dimensional digital tooth model. For example, a dataset defining the three-dimensional digital tooth model 100 comprises the identifier 104 identifying those sections of the three-dimensional digital tooth model 100 defined by the dataset, which are part of the dental key structure 102.

Figure 9:
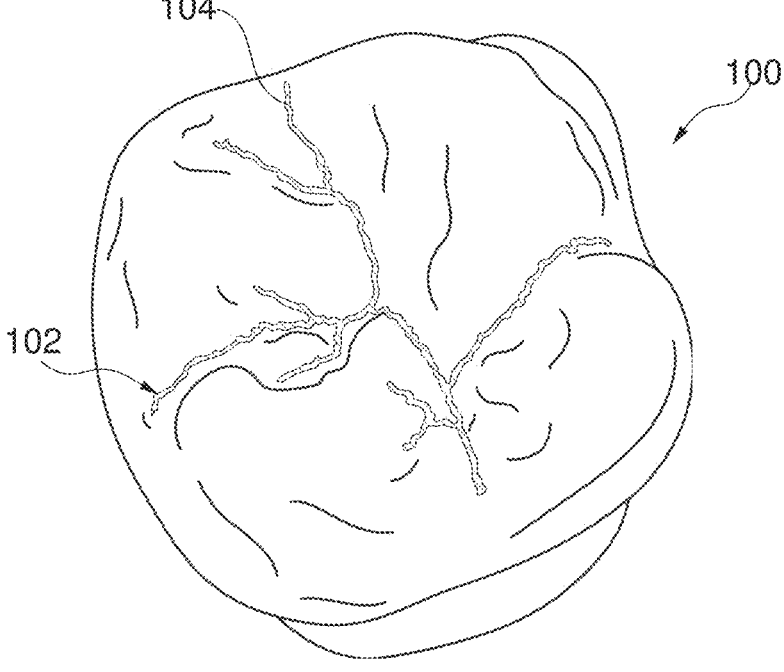
FIG. 9 shows a further exemplary three-dimensional digital tooth model with a dental key structure in form of fissures of the three-dimensional digital tooth model.

FIG. 9 shows an exemplary three-dimensional digital tooth model 100 of a molar, e.g., a first three-dimensional digital tooth model of a first set of three-dimensional digital templates for artificial teeth or a second three-dimensional digital tooth models of a second set of three-dimensional digital templates for artificial teeth. Dental key structures 102 in form of fissures surface of the three-dimensional digital tooth model 100 is highlighted. The dental key structures 102 are, e.g., first dental key structures of a first three-dimensional digital tooth model of a first set of three-dimensional digital templates for artificial teeth. The dental key structures 102 are, e.g., second dental key structures of a second three-dimensional digital tooth model of a second set of three-dimensional digital templates for artificial teeth. For example, the dental key structures 102 of the three-dimensional digital tooth model 100 are marked with identifiers 104 identifying the dental key structures 102. The identifiers 104 are, e.g., first identifiers identifying first dental key structures of a first three-dimensional digital tooth model. The identifier 104 are, e.g., a second identifiers identifying second dental key structures of a second three-dimensional digital tooth model. For example, a dataset defining the three-dimensional digital tooth model 100 comprises the identifiers 104 identifying those sections of the three-dimensional digital tooth model 100 defined by the dataset, which are part of the dental key structures 102.

Figure 10:
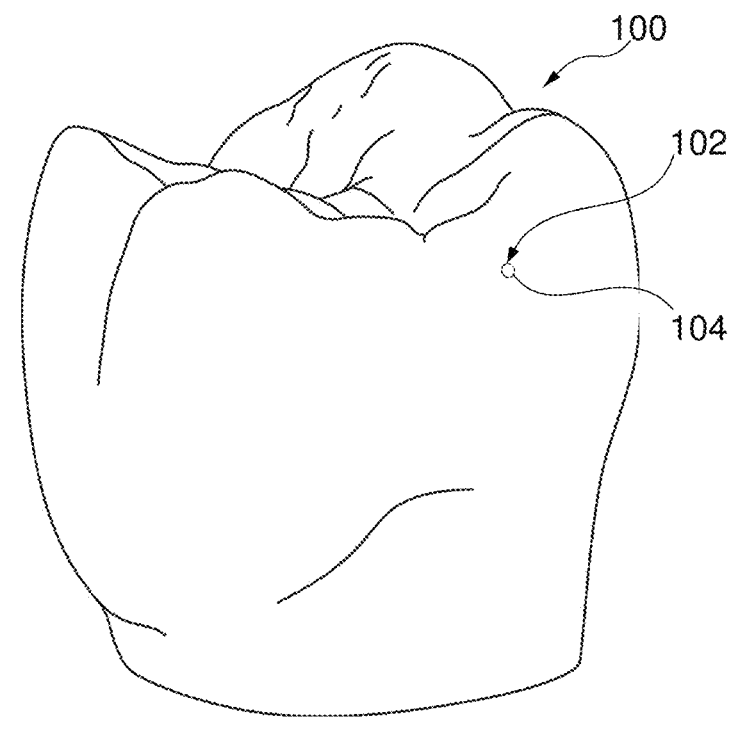
FIG. 10 shows a further exemplary three-dimensional digital tooth model with a dental key structure in form of an approximal contact point of the three-dimensional digital tooth model.

FIG. 10 shows an exemplary three-dimensional digital tooth model 100 of a molar, e.g., a first three-dimensional digital tooth model of a first set of three-dimensional digital templates for artificial teeth or a second three-dimensional digital tooth models of a second set of three-dimensional digital templates for artificial teeth. A dental key structure 102 in form of an approximal contact point of the three-dimensional digital tooth model 100 is highlighted. The approximal contact point is a contact point of the three-dimensional digital tooth model 100 with a neighboring tooth arranged next to the three-dimensional digital tooth model 100 in an approximal direction, e.g., mesial or distal direction. The dental key structure 102 is, e.g., a first dental key structure of a first three-dimensional digital tooth model of a first set of three-dimensional digital templates for artificial teeth. The dental key structure 102 is, e.g., a second dental key structure of a second three-dimensional digital tooth model of a second set of three-dimensional digital templates for artificial teeth. For example, the dental key structure 102 of the three-dimensional digital tooth model 100 is marked with an identifier 104 identifying the dental key structure 102. The identifier 104 is, e.g., a first identifier identifying a first dental key structure of a first three-dimensional digital tooth model. The identifier 104 is, e.g., a second identifier identifying a second dental key structure of a second three-dimensional digital tooth model. For example, a dataset defining the three-dimensional digital tooth model 100 comprises the identifier 104 identifying those sections of the three-dimensional digital tooth model 100 defined by the dataset, which are part of the dental key structure 102.

Figure 11:
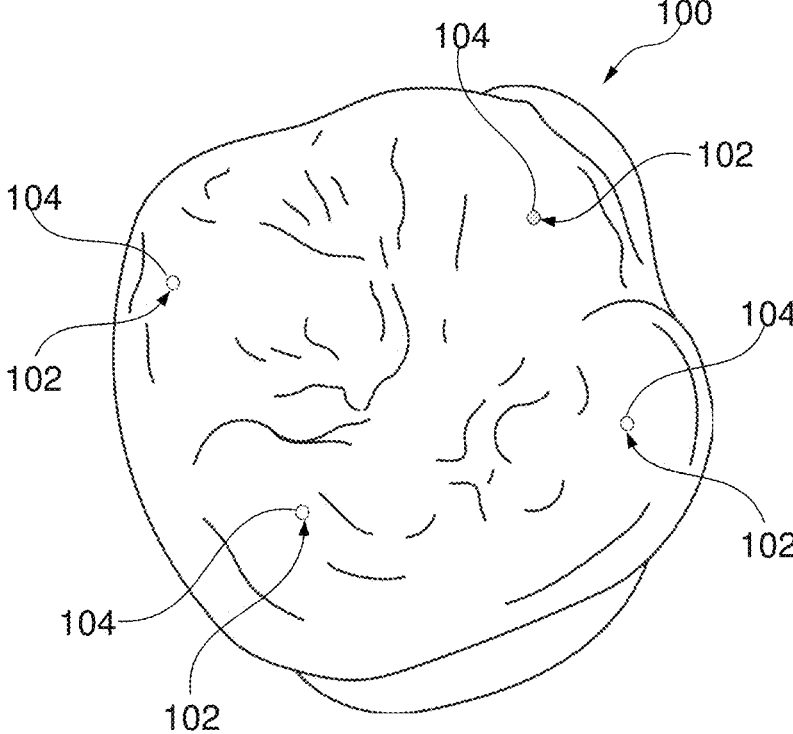
FIG. 11 shows a further exemplary three-dimensional digital tooth model with a dental key structure in form of cusp tips of the three-dimensional digital tooth model.

FIG. 11 shows an exemplary three-dimensional digital tooth model 100 of a molar, e.g., a first three-dimensional digital tooth model of a first set of three-dimensional digital templates for artificial teeth or a second three-dimensional digital tooth models of a second set of three-dimensional digital templates for artificial teeth. Dental key structures 102 in form of cups tips of the three-dimensional digital tooth model 100 is highlighted. The dental key structures 102 are, e.g., first dental key structures of a first three-dimensional digital tooth model of a first set of three-dimensional digital templates for artificial teeth. The dental key structures 102 are, e.g., second dental key structures of a second three-dimensional digital tooth model of a second set of three-dimensional digital templates for artificial teeth. For example, the dental key structures 102 of the three-dimensional digital tooth model 100 are marked with identifiers 104 identifying the dental key structures 102. The identifiers 104 are, e.g., first identifiers identifying first dental key structures of a first three-dimensional digital tooth model. The identifier 104 are, e.g., a second identifiers identifying second dental key structures of a second three-dimensional digital tooth model. For example, a dataset defining the three-dimensional digital tooth model 100 comprises the identifiers 104 identifying those sections of the three-dimensional digital tooth model 100 defined by the dataset, which are part of the dental key structures 102.

Figure 12:
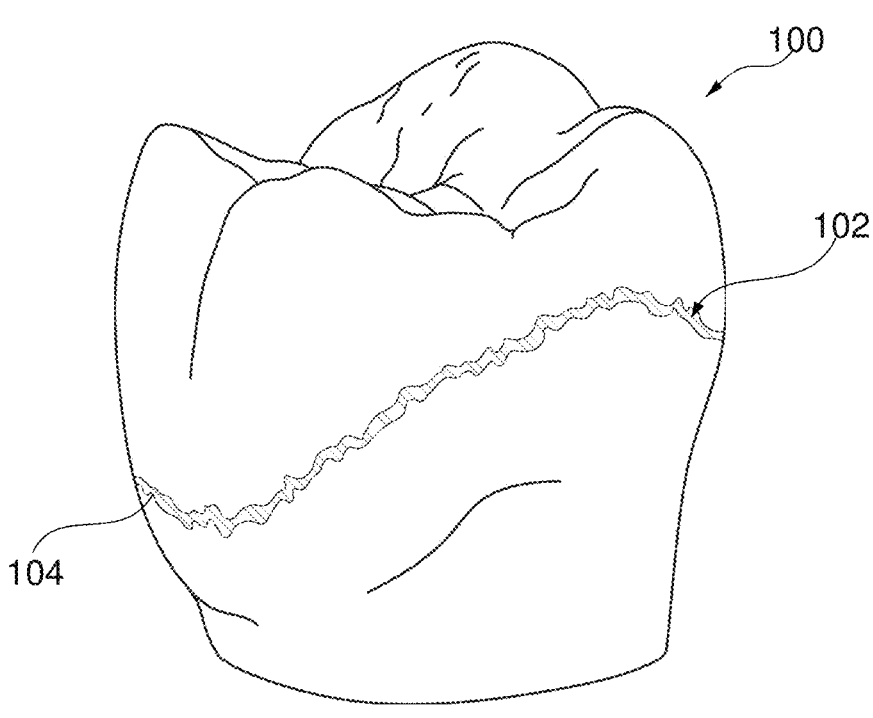
FIG. 12 shows a further exemplary three-dimensional digital tooth model with a dental key structure in form of an equatorial line of the three-dimensional digital tooth model.

FIG. 12 shows an exemplary three-dimensional digital tooth model 100 of a molar, e.g., a first three-dimensional digital tooth model of a first set of three-dimensional digital templates for artificial teeth or a second three-dimensional digital tooth models of a second set of three-dimensional digital templates for artificial teeth. A dental key structure 102 in form of an equatorial line of the three-dimensional digital tooth model 100 is highlighted. The dental key structure 102 is, e.g., a first dental key structure of a first three-dimensional digital tooth model of a first set of three-dimensional digital templates for artificial teeth. The dental key structure 102 is, e.g., a second dental key structure of a second three-dimensional digital tooth model of a second set of three-dimensional digital templates for artificial teeth. For example, the dental key structure 102 of the three-dimensional digital tooth model 100 is marked with an identifier 104 identifying the dental key structure 102. The identifier 104 is, e.g., a first identifier identifying a first dental key structure of a first three-dimensional digital tooth model. The identifier 104 is, e.g., a second identifier identifying a second dental key structure of a second three-dimensional digital tooth model. For example, a dataset defining the three-dimensional digital tooth model 100 comprises the identifier 104 identifying those sections of the three-dimensional digital tooth model 100 defined by the dataset, which are part of the dental key structure 102.

Figure 13:
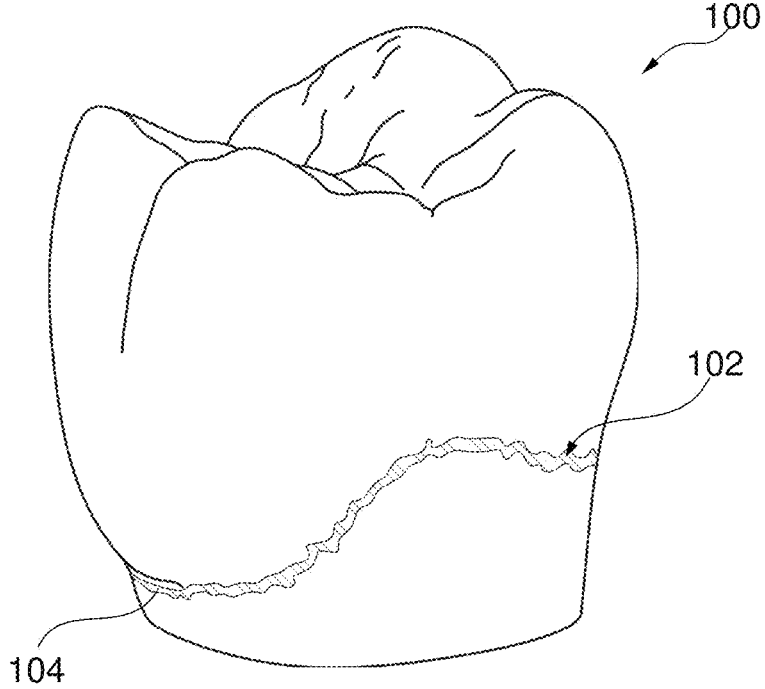
FIG. 13 shows a further exemplary three-dimensional digital tooth model with a dental key structure in form of a cervical boundary of the three-dimensional digital tooth model.

FIG. 13 shows an exemplary three-dimensional digital tooth model 100 of a molar, e.g., a first three-dimensional digital tooth model of a first set of three-dimensional digital templates for artificial teeth or a second three-dimensional digital tooth models of a second set of three-dimensional digital templates for artificial teeth. A dental key structure 102 in form of a cervical boundary line of the three-dimensional digital tooth model 100 is highlighted. The dental key structure 102 is, e.g., a first dental key structure of a first three-dimensional digital tooth model of a first set of three-dimensional digital templates for artificial teeth. The dental key structure 102 is, e.g., a second dental key structure of a second three-dimensional digital tooth model of a second set of three-dimensional digital templates for artificial teeth. For example, the dental key structure 102 of the three-dimensional digital tooth model 100 is marked with an identifier 104 identifying the dental key structure 102. The identifier 104 is, e.g., a first identifier identifying a first dental key structure of a first three-dimensional digital tooth model. The identifier 104 is, e.g., a second identifier identifying a second dental key structure of a second three-dimensional digital tooth model. For example, a dataset defining the three-dimensional digital tooth model 100 comprises the identifier 104 identifying those sections of the three-dimensional digital tooth model 100 defined by the dataset, which are part of the dental key structure 102.

Figure 14:
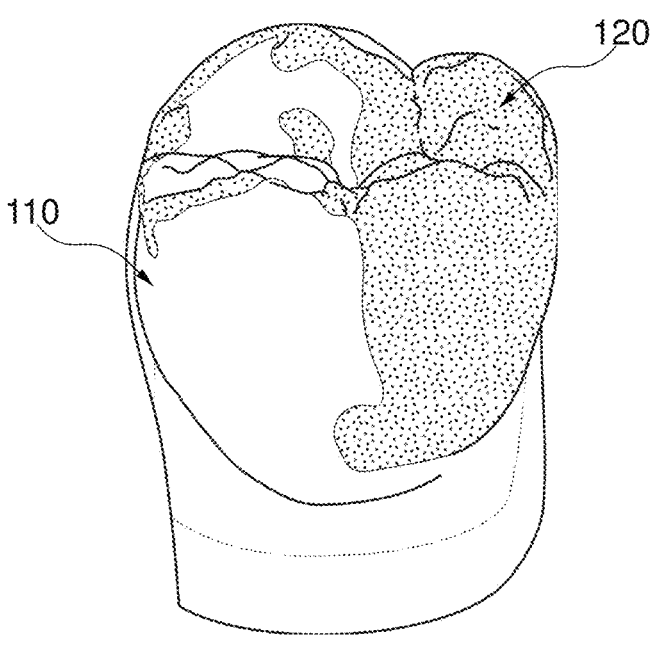
FIG. 14 shows an exemplary first three-dimensional digital tooth model and an exemplary second three-dimensional digital tooth model.

FIG. 14 shows an exemplary first three-dimensional digital tooth model 110 of a first set of three-dimensional digital templates for artificial teeth. The first three-dimensional digital tooth model 110 is arranged at tooth position with a tooth orientation. Furthermore, a second three-dimensional digital tooth model 120 of a second set of three-dimensional digital templates for artificial teeth. The second three-dimensional digital tooth model 120 is arranged at the same tooth position and with the same tooth orientation as the first three-dimensional digital tooth model 110. In addition, e.g., the size of the second three-dimensional digital tooth model 120 may be scaled to match the size of the first three-dimensional digital tooth model 110. The exemplary first and second three-dimensional digital tooth models 110, 120 are, e.g., models of a molar. The first three-dimensional digital tooth model 110 comprises dental key structures (not shown), which are marked with first identifiers (not shown) identifying the dental key structures. The second three-dimensional digital tooth model 120 comprises dental key structures (not shown), which are marked with second identifiers (not shown) identifying the dental key structures.

For example, the dental key structures are cusps. The shape of the second three-dimensional digital tooth model 120 may be adjusted, such that the cusps of the adjusted second three-dimensional digital tooth model 120 match the cusps of the first three-dimensional digital tooth model 110. When adjusting the shape of the second three-dimensional digital tooth model 120, for example the cusps may be adjusted, while the rest of the second three-dimensional digital tooth model 120, e.g., a cervical part of the second three-dimensional digital tooth model 120, remains unchanged. The cusps of the second three-dimensional digital tooth model 120 may, e.g., be translated, rotated, scaled, and/or deformed to match the cusps of the first three-dimensional digital tooth model 110.

Figures 15A, 15B:
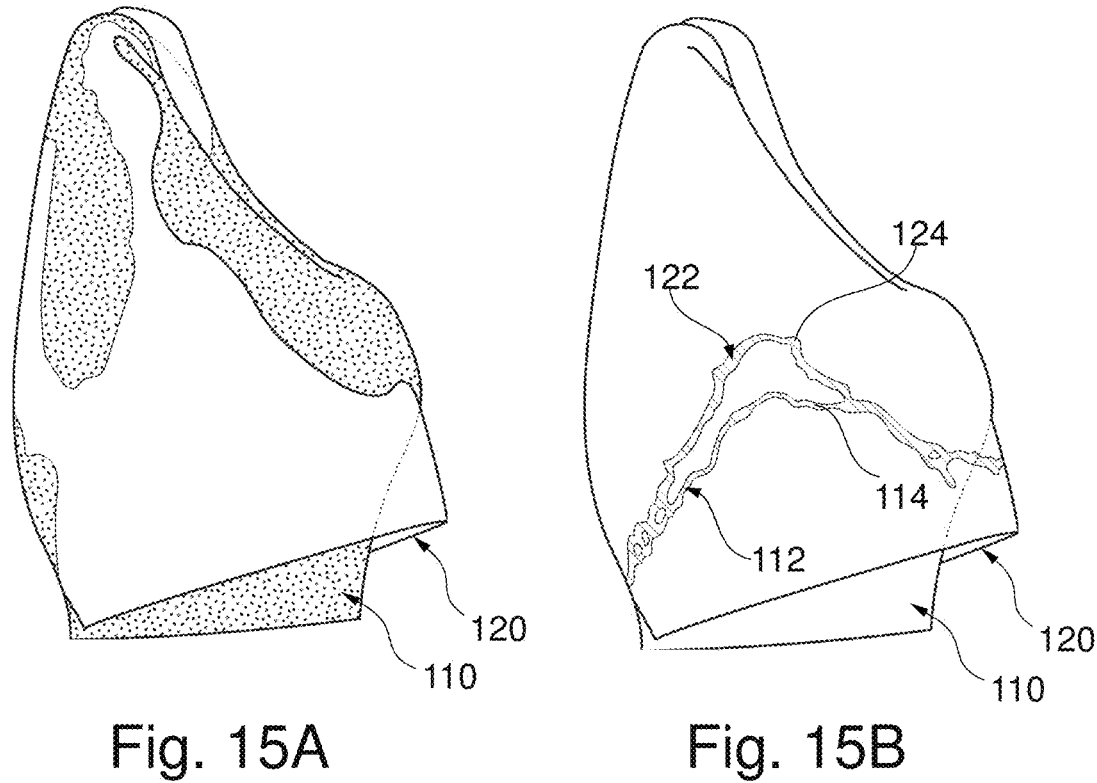
FIG. 15A shows a further exemplary first three-dimensional digital tooth model and a further exemplary second three-dimensional digital tooth model.
FIG. 15B shows the exemplary first and second three-dimensional digital tooth models of FIG. 15A.

FIG. 15A shows a further exemplary first three-dimensional digital tooth model 110 of a first set of three-dimensional digital templates for artificial teeth. The first three-dimensional digital tooth model 110 is arranged at tooth position with a tooth orientation. Furthermore, a further second three-dimensional digital tooth model 120 of a second set of three-dimensional digital templates for artificial teeth. The second three-dimensional digital tooth model 120 is arranged at the same tooth position and with the same tooth orientation as the first three-dimensional digital tooth model 110. The exemplary first and second three-dimensional digital tooth models 110, 120 are, e.g., models of an incisor. The first three-dimensional digital tooth model 110 comprises a dental key structure (not shown), which is marked with a first identifier (not shown) identifying the dental key structure. The second three-dimensional digital tooth model 120 comprises a dental key structure (not shown), which is marked with a second identifier (not shown) identifying the dental key structure.

For example, the dental key structure is a cervical boundary line. The shape of the second three-dimensional digital tooth model 120 may be adjusted, such that the cervical boundary line of the adjusted second three-dimensional digital tooth model 120 matches the cervical boundary line of the first three-dimensional digital tooth model 110. When adjusting the shape of the second three-dimensional digital tooth model 120, for example the cervical boundary line may be adjusted, while the rest of the second three-dimensional digital tooth model 120, e.g., an incisal part of the second three-dimensional digital tooth model 120, remains unchanged. The cervical boundary line of the second three-dimensional digital tooth model 120 may, e.g., be translated, rotated, scaled, and/or deformed to match the cervical boundary line of the first three-dimensional digital tooth model 110.

FIG. 15B shows the first and second three-dimensional digital tooth models 110, 120 of FIG. 15A with the first and second dental key structures 112, 122 highlighted. The first and second dental key structures 112, 122 are indicated by a first and second identifier 114, 124, respectively.

Figures 16A, 16B:
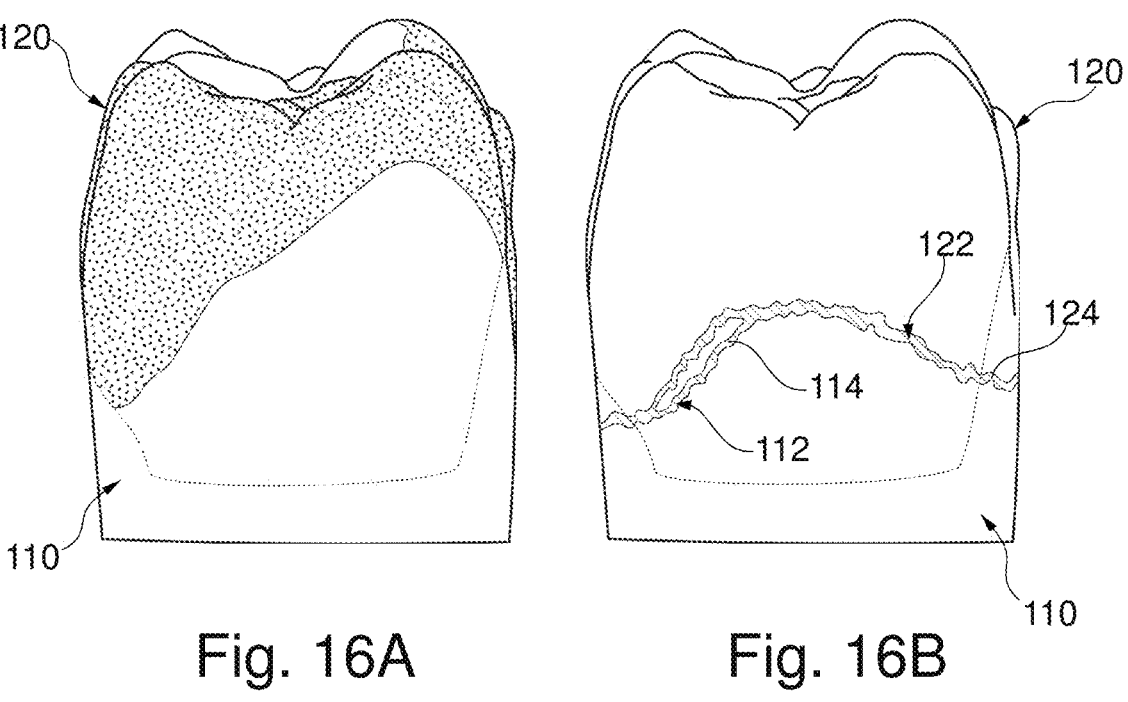
FIG. 16A shows a further exemplary first three-dimensional digital tooth model and a further exemplary second three-dimensional digital tooth model.
FIG. 16B shows the exemplary first and second three-dimensional digital tooth models of FIG. 16A.

FIG. 16A shows a further exemplary first three-dimensional digital tooth model 110 of a first set of three-dimensional digital templates for artificial teeth. The first three-dimensional digital tooth model 110 is arranged at tooth position with a tooth orientation. Furthermore, a further second three-dimensional digital tooth model 120 of a second set of three-dimensional digital templates for artificial teeth. The second three-dimensional digital tooth model 120 is arranged at the same tooth position and with the same tooth orientation as the first three-dimensional digital tooth model 110. The exemplary first and second three-dimensional digital tooth models 110, 120 are, e.g., models of a molar. The first three-dimensional digital tooth model 110 comprises a dental key structure (not shown), which is marked with a first identifier (not shown) identifying the dental key structure. The second three-dimensional digital tooth model 120 comprises a dental key structure (not shown), which is marked with a second identifier (not shown) identifying the dental key structure.

For example, the dental key structure is a cervical boundary line. The shape of the second three-dimensional digital tooth model 120 may be adjusted, such that the cervical boundary line of the adjusted second three-dimensional digital tooth model 120 matches the cervical boundary line of the first three-dimensional digital tooth model 110. When adjusting the shape of the second three-dimensional digital tooth model 120, for example the cervical boundary line may be adjusted, while the rest of the second three-dimensional digital tooth model 120, e.g., a chewing part of the second three-dimensional digital tooth model 120, remains unchanged. The cervical boundary line of the second three-dimensional digital tooth model 120 may, e.g., be translated, rotated, scaled, and/or deformed to match the cervical boundary line of the first three-dimensional digital tooth model 110.

FIG. 16B shows the first and second three-dimensional digital tooth models 110, 120 of FIG. 16A with the first and second dental key structures 112, 122 highlighted. The first and second dental key structures 112, 122 are indicated by a first and second identifier 114, 124, respectively.

Figures 17A, 17B:
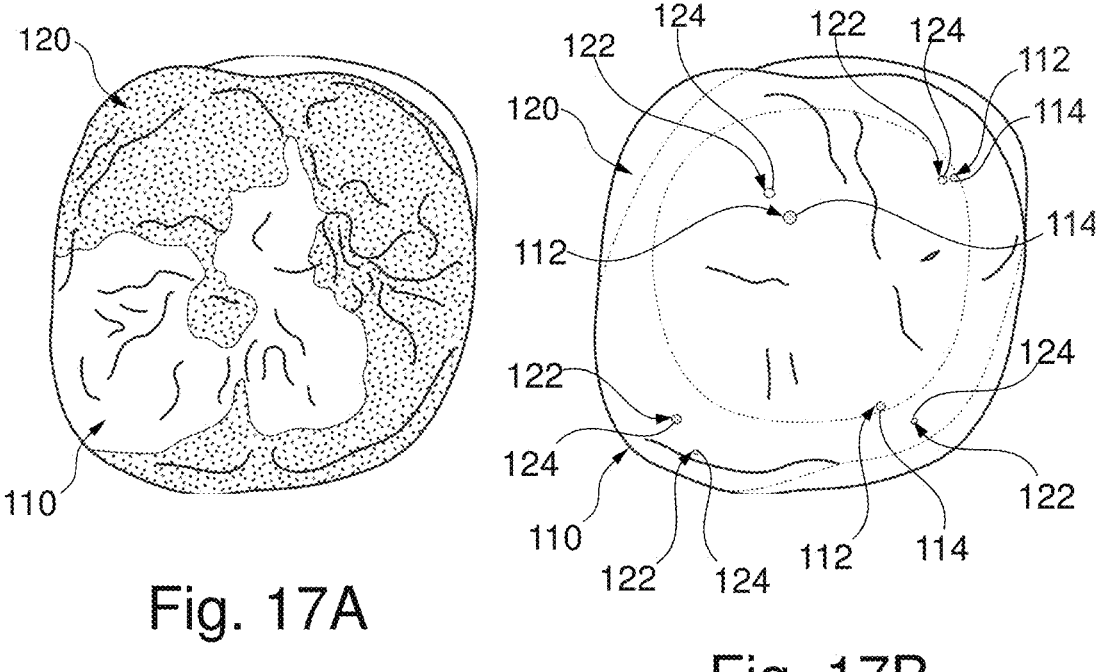
FIG. 17A shows a further exemplary first three-dimensional digital tooth model and a further exemplary second three-dimensional digital tooth model.
FIG. 17B shows the exemplary first and second three-dimensional digital tooth models of FIG. 17A.

FIG. 17A shows an exemplary first three-dimensional digital tooth model 110 of a first set of three-dimensional digital templates for artificial teeth. The first three-dimensional digital tooth model 110 is arranged at tooth position with a tooth orientation. Furthermore, a second three-dimensional digital tooth model 120 of a second set of three-dimensional digital templates for artificial teeth. The second three-dimensional digital tooth model 120 is arranged at the same tooth position and with the same tooth orientation as the first three-dimensional digital tooth model 110. The exemplary first and second three-dimensional digital tooth models 110, 120 are, e.g., models of a molar. The first three-dimensional digital tooth model 110 comprises dental key structures (not shown), which are marked with first identifiers (not shown) identifying the dental key structures. The second three-dimensional digital tooth model 120 comprises dental key structures (not shown), which are marked with second identifiers (not shown) identifying the dental key structures.

For example, the dental key structures are cusps. The shape of the second three-dimensional digital tooth model 120 may be adjusted, such that the cusps of the adjusted second three-dimensional digital tooth model 120 match the cusps of the first three-dimensional digital tooth model 110. When adjusting the shape of the second three-dimensional digital tooth model 120, for example the cusps may be adjusted, while the rest of the second three-dimensional digital tooth model 120, e.g., a cervical part of the second three-dimensional digital tooth model 120, remains unchanged. The cusps of the second three-dimensional digital tooth model 120 may, e.g., be translated, rotated, scaled, and/or deformed to match the cusps of the first three-dimensional digital tooth model 110.

FIG. 17B shows the first and second three-dimensional digital tooth models 110, 120 of FIG. 17A with the first and second dental key structures 112, 122 highlighted. The first and second dental key structures 112, 122 are indicated by a first and second identifier 114, 124, respectively.

Figure 18:
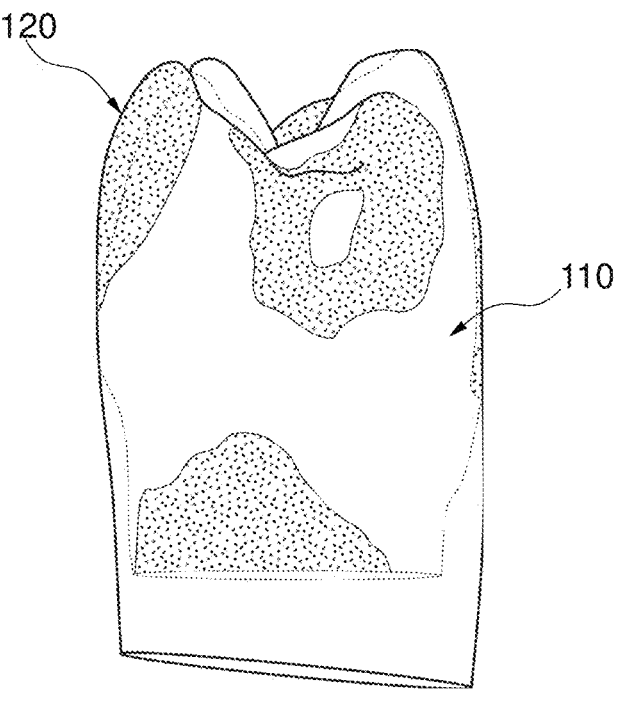
FIG. 18 shows a further exemplary first three-dimensional digital tooth model and a further exemplary second three-dimensional digital tooth model.

FIG. 18 shows a further exemplary first three-dimensional digital tooth model 110 of a first set of three-dimensional digital templates for artificial teeth. The first three-dimensional digital tooth model 110 is arranged at tooth position with a tooth orientation. Furthermore, a further second three-dimensional digital tooth model 120 of a second set of three-dimensional digital templates for artificial teeth. The second three-dimensional digital tooth model 120 is arranged at the same tooth position and with the same tooth orientation as the first three-dimensional digital tooth model 110. The exemplary first and second three-dimensional digital tooth models 110, 120 are, e.g., models of a premolar. The first three-dimensional digital tooth model 110 comprises a dental key structure (not shown), which is marked with a first identifier (not shown) identifying the dental key structure. The second three-dimensional digital tooth model 120 comprises a dental key structure (not shown), which is marked with a second identifier (not shown) identifying the dental key structure.

For example, the dental key structures are cusps. The shape of the second three-dimensional digital tooth model 120 may be adjusted, such that the cusps of the adjusted second three-dimensional digital tooth model 120 match the cusps of the first three-dimensional digital tooth model 110. When adjusting the shape of the second three-dimensional digital tooth model 120, for example the cusps may be adjusted, while the rest of the second three-dimensional digital tooth model 120, e.g., a cervical part of the second three-dimensional digital tooth model 120, remains unchanged. The cusps of the second three-dimensional digital tooth model 120 may, e.g., be translated, rotated, scaled, and/or deformed to match the cusps of the first three-dimensional digital tooth model 110.

Figure 19:
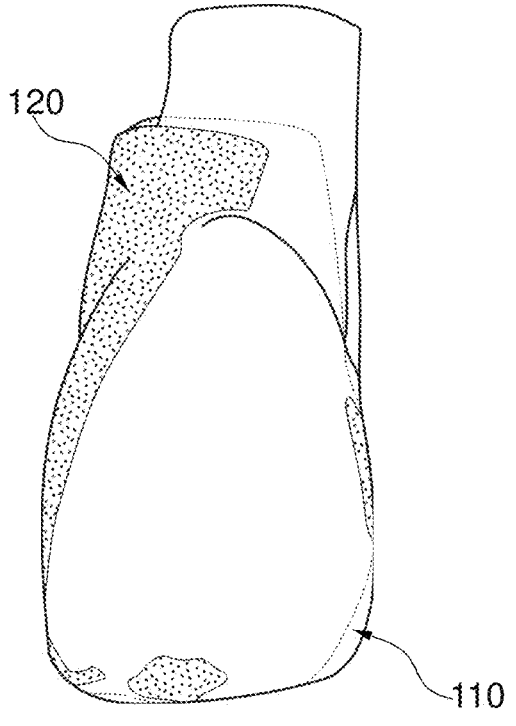
FIG. 19 shows a further exemplary first three-dimensional digital tooth model and a further exemplary second three-dimensional digital tooth model.

FIG. 19 shows a further exemplary first three-dimensional digital tooth model 110 of a first set of three-dimensional digital templates for artificial teeth. The first three-dimensional digital tooth model 110 is arranged at tooth position with a tooth orientation. Furthermore, a further second three-dimensional digital tooth model 120 of a second set of three-dimensional digital templates for artificial teeth. The second three-dimensional digital tooth model 120 is arranged at the same tooth position and with the same tooth orientation as the first three-dimensional digital tooth model 110. The exemplary first and second three-dimensional digital tooth models 110, 120 are, e.g., models of an incisor.

The first three-dimensional digital tooth model 110 comprises a dental key structure (not shown), which is marked with a first identifier (not shown) identifying the dental key structure. The second three-dimensional digital tooth model 120 comprises a dental key structure (not shown), which is marked with a second identifier (not shown) identifying the dental key structure.

For example, the dental key structure is a cervical boundary line. The shape of the second three-dimensional digital tooth model 120 may be adjusted, such that the cervical boundary line of the adjusted second three-dimensional digital tooth model 120 matches the cervical boundary line of the first three-dimensional digital tooth model 110. When adjusting the shape of the second three-dimensional digital tooth model 120, for example the cervical boundary line may be adjusted, while the rest of the second three-dimensional digital tooth model 120, e.g., an incisal part of the second three-dimensional digital tooth model 120, remains unchanged. The cervical boundary line of the second three-dimensional digital tooth model 120 may, e.g., be translated, rotated, scaled, and/or deformed to match the cervical boundary line of the first three-dimensional digital tooth model 110.

Figure 20:
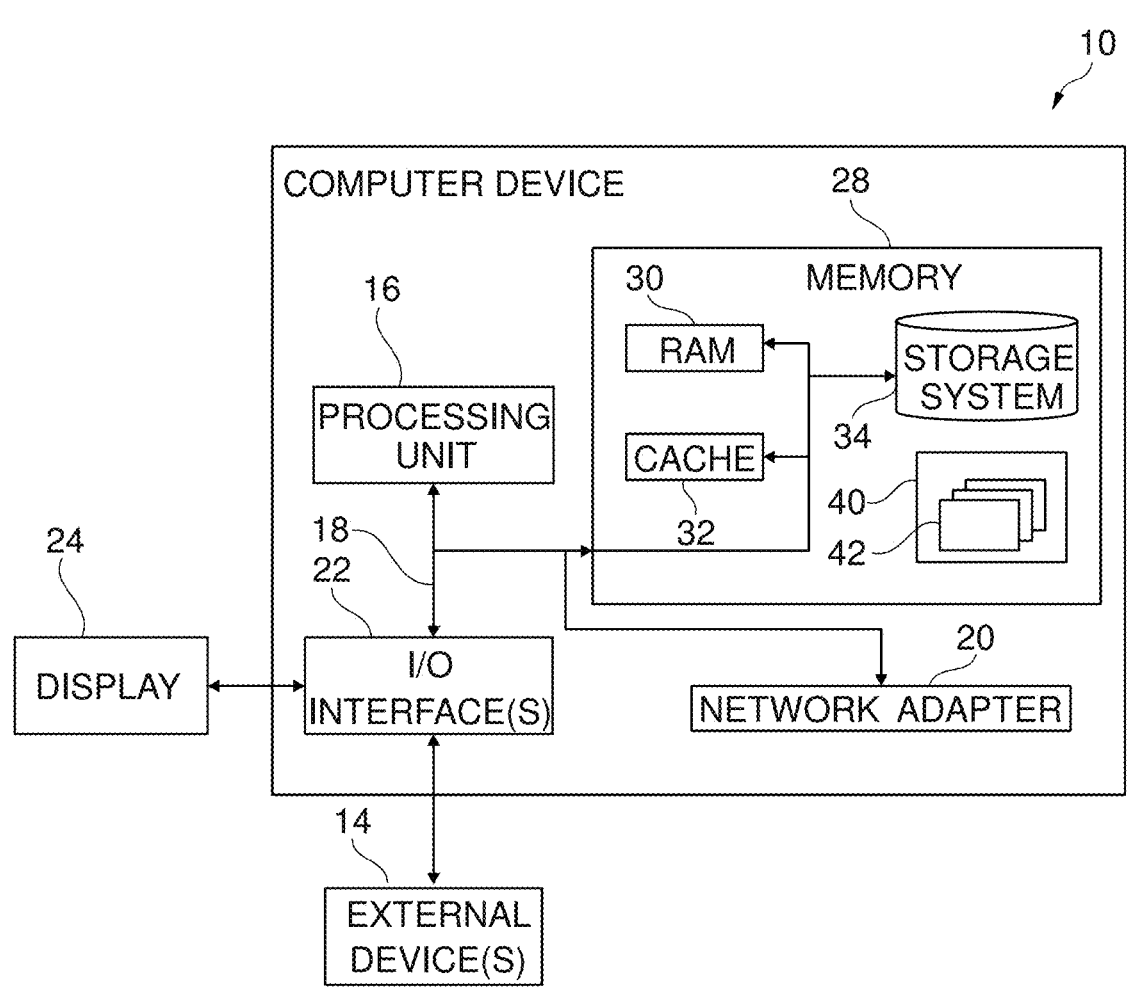
FIG. 20 shows an exemplary computer device for replacing three-dimensional digital tooth models.

FIG. 20 shows a schematic diagram of an exemplary computer device 10 for replacing one or more first three-dimensional digital tooth models of a first set of three-dimensional digital templates for artificial teeth by one or more second three-dimensional digital tooth models of a second set of three-dimensional digital templates for artificial teeth. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 20, computer device 10 is shown in the form of an exemplary general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include at least two sets of three-dimensional digital templates for artificial teeth. Each of the templates comprises three-dimensional digital tooth models. These three-dimensional digital tooth models comprise dental key structures marked with identifiers identifying the dental key structures. For example, memory 28 may include more than two sets of three-dimensional digital templates for artificial teeth. Memory 28 may, e.g., include a three-dimensional digital anatomic model of an oral anatomic structure of a patient. The three-dimensional digital anatomic model of an oral anatomic structure may, e.g., be included with or without one or more three-dimensional digital tooth models of a set of three-dimensional digital templates for artificial teeth arranged with respect to the three-dimensional digital anatomic model at one or more tooth positions with one or more tooth orientations.

Memory 28 may, e.g., include data for controlling a manufacturing of one or more artificial teeth. The control data may be generated by the computer device 10, when executing the method for replacing the one or more first three-dimensional digital tooth models, and define adjusted one or more second three-dimensional digital tooth models as one or more templates for the one or more artificial teeth to be manufactured.

Program 40 may have a set of one or more program modules 42 and by way of example be stored in memory 28. The program modules 42 may comprise an operating system, one or more application programs, other program modules, and/or program data. Each of these program modules 42, i.e, the operating system, the one or more application programs, the other program modules, and/or the program data or some combination thereof, may include an implementation of a networking environment. One or more of the program modules 42 may be configured for executing a method for replacing one or more first three-dimensional digital tooth models of a first set of three-dimensional digital templates for artificial teeth by one or more second three-dimensional digital tooth models of a second set of three-dimensional digital templates for artificial teeth.

One or more of the program modules 42 may be configured for controlling a manufacturing of one or more artificial teeth. One or more of the program modules 42 may, e.g., be configured for executing one or more of the methods of FIG. 1 to 5.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 20 may be configured for replacing one or more first three-dimensional digital tooth models of a first set of three-dimensional digital templates for artificial teeth by one or more second three-dimensional digital tooth models of a second set of three-dimensional digital templates for artificial teeth. The method comprises receiving a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations. The one or more first three-dimensional digital tooth models comprise one or more dental key structures marked with one or more first identifiers identifying the one or more dental key structures. One or more first three-dimensional digital tooth models of the one or more arranged first three-dimensional digital tooth models are selected for a replacement. The selected one or more first three-dimensional digital tooth models are replaced by the one or more second three-dimensional digital tooth models of the second set of three-dimensional digital templates for artificial teeth. The one or more second three-dimensional digital tooth models comprise one or more dental key structures marked with one or more second identifiers identifying the one or more dental key structures.

The replacing comprises arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models. The one or more dental key structures of the selected one or more first three-dimensional digital tooth models are identified using the one or more first identifiers. The one or more dental key structures of the arranged one or more second three-dimensional digital tooth models are identified using the one or more second identifiers. One or more shapes of the one or more arranged second three-dimensional digital tooth models are adjusted, such that the identified one or more dental key structures of the adjusted one or more second three-dimensional digital tooth models match the one or more identified dental key structures of the selected one or more first three-dimensional digital tooth models.

The computer device 10 shown in FIG. 20 may, e.g., further be configured for providing data for controlling a manufacturing of one or more artificial teeth. The control data define the adjusted one or more second three-dimensional digital tooth models as one or more templates for the one or more artificial teeth.

The computer device 10 shown in FIG. 20 may, e.g., further be configured for controlling the manufacturing of the one or more artificial teeth using the data provided for controlling the manufacturing. The manufactured one or more artificial teeth are one or more physical copies of the one or more templates defined by the provided data.

Figure 21:
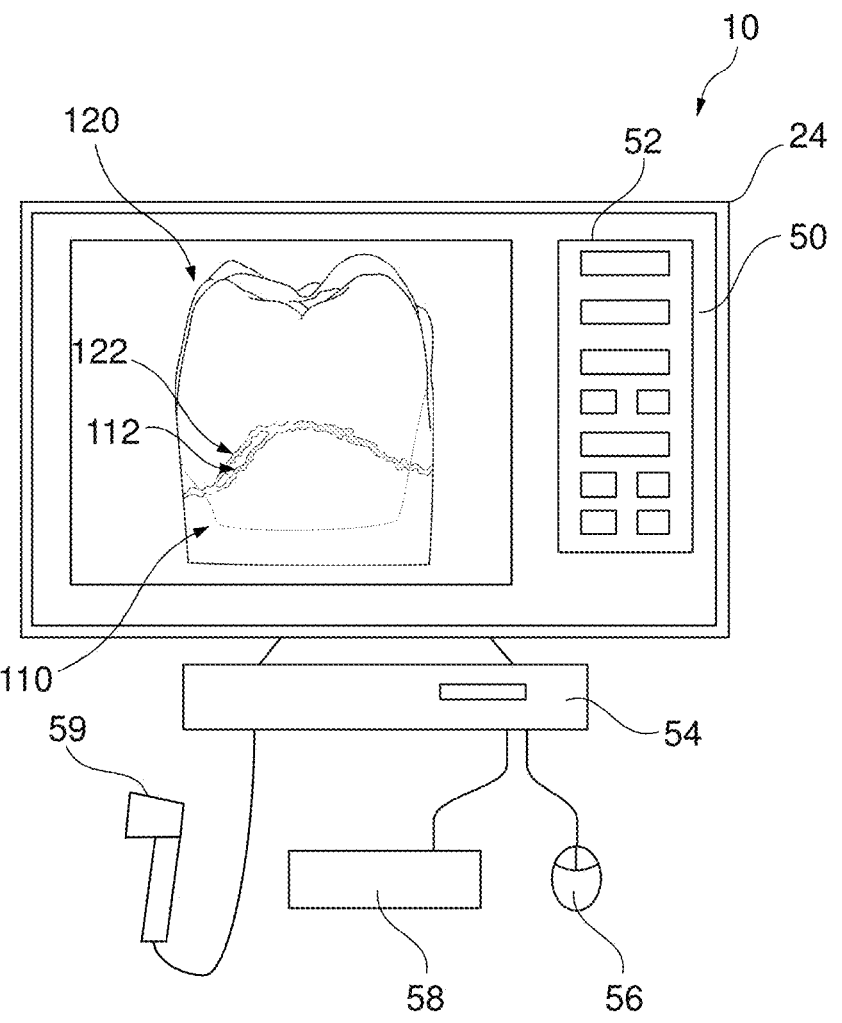
FIG. 21 shows an exemplary computer device for replacing three-dimensional digital tooth models.

FIG. 21 shows an exemplary computer device 10 replacing one or more first three-dimensional digital tooth models of a first set of three-dimensional digital templates for artificial teeth by one or more second three-dimensional digital tooth models of a second set of three-dimensional digital templates for artificial teeth. The computer device 10 may, e.g., be configured as shown in FIG. 20. The computer device 10 may comprise a hardware component 54 comprising one or more processors as well as a memory storing machine-executable program instructions. Execution of the program instructions by the one or more processors may cause the one or more processors to control the computer device 10 to, e.g, replace one or more first three-dimensional digital tooth models of a first set of three-dimensional digital templates for artificial teeth by one or more second three-dimensional digital tooth models of a second set of three-dimensional digital templates for artificial teeth.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g, GUI elements, enabling the user to control the replacing of the one or more first three-dimensional digital tooth models. The computer device 10 may further comprise an exemplary scanner 59 configured for scanning a patient's mouth. The scanner 59 may, e.g., comprise an optical scanner configured for scanning, e.g., a patient's oral cavity, an imprint of a patient's oral cavity and/or a positive of a patient's oral cavity generated using an imprint.

Figure 22:
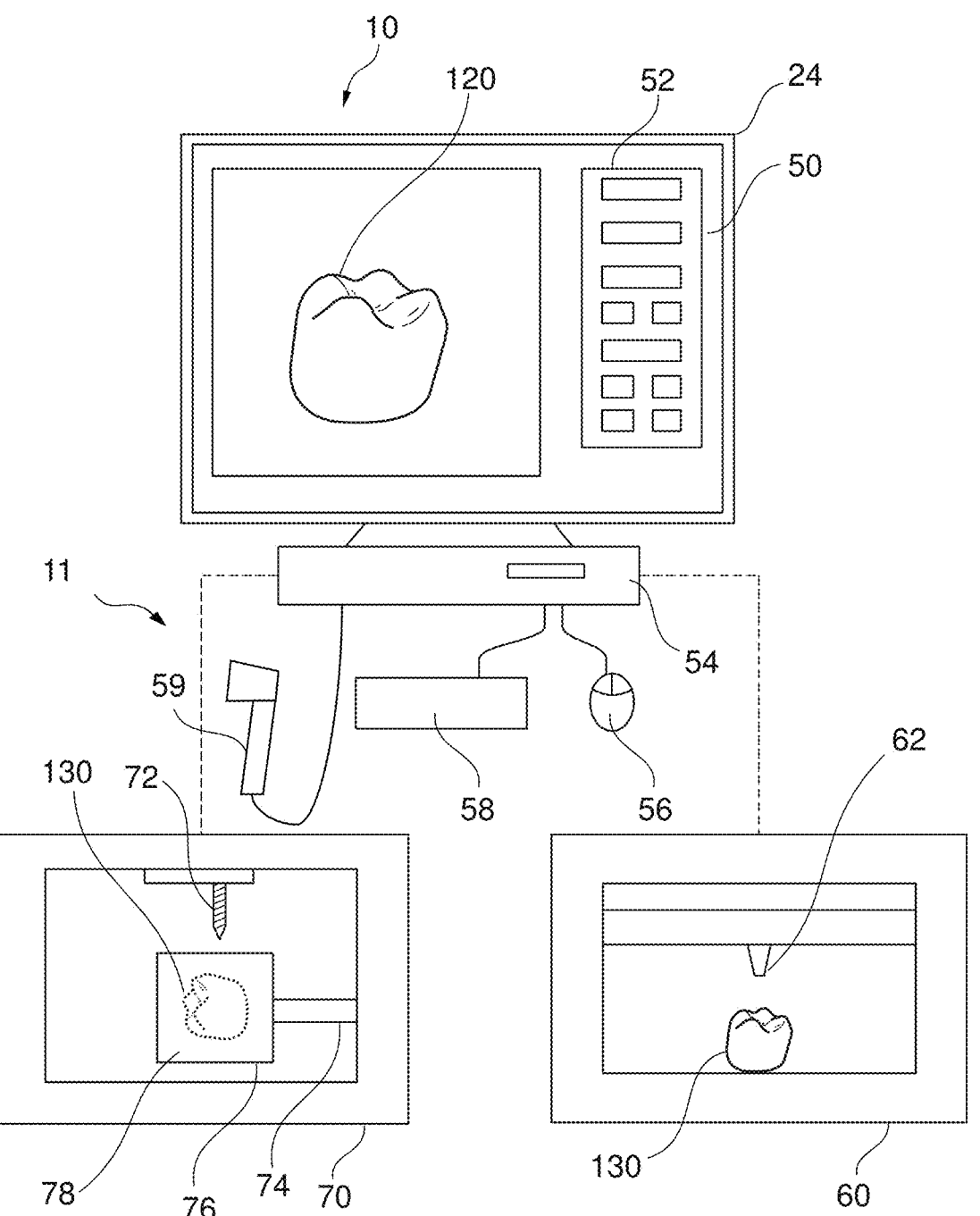
FIG. 22 shows an exemplary manufacturing system for manufacturing artificial teeth.

FIG. 22 shows an exemplary manufacturing system 11 for manufacturing one or more artificial teeth 130. For manufacturing the one or more artificial teeth 130, control data may be used provided for controlling the manufacturing. The control data provided for controlling the manufacturing of the one or more artificial teeth 130 may define adjusted one or more second three-dimensional digital tooth models, which have been used to replace one or more first three-dimensional digital tooth models, as one or more templates for the one or more artificial teeth 130. The one or more manufactured artificial teeth 130 may be physical copies of the templates defined by the provided control data.

The manufacturing system 11 may comprise the computer device 10 of FIG. 21. The computer device 10 may further be configured to control one or more manufacturing devices 60, 70. For controlling the one or more manufacturing devices 60, 70 a processing unit of the computer device 10 may execute program instructions. Execution of the program instructions by the processing unit may cause the computer device 10 to control the one or more manufacturing devices 60, 70 to manufacture the one or more artificial teeth 130 using the control data provided for controlling the manufacturing.

For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using one or more holding devices 74 and cut into a desired shape and size of the element to be manufactured, e.g., an artificial tooth 130. The machining tool 72 may, e.g., be a milling tool.

For example, the manufacturing system 11 may comprise a manufacturing device in form of a three-dimensional (3D) printing device 60. The 3D printing device 60 may be controlled by the computer device 10 and configured to print an element to be manufactured, e.g., an artificial tooth 130. The 3D printing device 60 may comprise a printing element 62 configured to generate the respective element, like the artificial tooth 130, layer by layer. The printing element 62 may, e.g., comprise a nozzle configured for distributing printing material.

For example, the three-dimensional digital model 122 may be used as a positive to define a negative of the treatment element 120 in form of a negative three-dimensional model. The negative three-dimensional digital model may be used to manufacture, e.g., using machining device 70 or 3D printing device 60, a casting matrix. The casting matrix may be configured for casting the treatment element 120 by inserting casting material into the casting matrix and curing the inserted casting material.

The one or more artificial teeth 130 being manufactured may, e.g., be manufactured in form of a crown or a bridge or as parts to be added to a bridge or a denture. For example, the artificial teeth 130 may be manufactured as single teeth to be added to a denture. For example, the artificial teeth 130 may be manufactured as a part of a dental arch to be added to a denture. For example, the artificial teeth 130 may be manufactured as a complete dental arch to be added to a denture. For example, one or more additional dental elements may be manufactured, which are configured for arranging the one or more artificial teeth 130 in a patient's oral cavity. For example, the one or more additional dental elements may comprise one or more of the following: one or more implants, one or more abutments.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system" Furthermore, aspects of the present invention may take the form of a computer program product embodied in one or more computer readable medium(s) having computer executable code embodied thereon, A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention may have been described in reference to specific examples, it should be understood that the invention is not limited to these examples only and that many variations of these examples may be readily envisioned by the skilled person after having read the present disclosure. The invention may thus further be described without limitation and by way of example only by the following embodiments. The following exemplary embodiments may contain preferred embodiments. Accordingly, the term "feature combination" as used therein may refer to such a "preferred embodiment".

1. A method for replacing one or more first three-dimensional digital tooth models of a first set of three-dimensional digital templates for artificial teeth by one or more second three-dimensional digital tooth models of a second set of three-dimensional digital templates for artificial teeth, the method comprising:

receiving a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, selecting one or more first three-dimensional digital tooth models of the one or more arranged first three-dimensional digital tooth models for a replacement, replacing the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the one or more arranged second three-dimensional digital tooth models, such that the identified one or more dental key structures of the adjusted one or more second three-dimensional digital tooth models match the one or more identified dental key structures of the selected one or more first three-dimensional digital tooth models.

2. The method of feature combination 1, the adjusting of the one or more shapes of the arranged one or more second three-dimensional digital tooth models comprising applying one or more adjustments to one or more sections of the one or more shapes comprising the identified one or more dental key structures, the applied adjustments comprising one or more of the following adjustments: a translation, a rotation, a scaling, a deformation.

3. The method of feature combination 2, the method further comprising maintaining positions, orientations, sizes, and shapes of remaining sections of the one or more shapes of the one or more second three-dimensional digital tooth models, while adjusting the sections of the one or more second three-dimensional digital tooth models comprising the identified one or more dental key structures.

4. The method of any of the previous feature combinations, the arranging of the one or more second three-dimensional digital tooth models comprising scaling sizes of one or more of the second three-dimensional digital tooth models.

5. The method of any of the previous feature combinations, the one or more dental key structures comprising one or more of the following: occlusal contact patches, approximal contact patches, cervical boundary lines, equatorial lines, chewing surfaces, cusps, fissures, incisal edges.

6. The method of any of the previous feature combinations, the receiving of the three-dimensional digital anatomic model and the one or more first three-dimensional digital tooth models comprising:

receiving the three-dimensional digital anatomic model without the one or more first three-dimensional digital tooth models of the first set of three-dimensional digital templates for artificial teeth, receiving the one or more first three-dimensional digital tooth models, arranging the received one or more first three-dimensional digital tooth models with respect to the three-dimensional digital anatomic model at the one or more tooth positions with the one or more tooth orientations.

7. The method of feature combination 6, the arranging of the received one or more first three-dimensional digital tooth models comprising an adjusting of the received one or more first three-dimensional digital tooth models to one or more anatomical conditions of the patient defined by the three-dimensional digital anatomic model.

8. The method of feature combination 7, the adjusting of the received one or more first three-dimensional digital tooth models comprising one or more of the following: scaling sizes of one or more of the received one or more first three-dimensional digital tooth models, deforming one or more of the received one or more first three-dimensional digital tooth models.

9. The method of any of feature combinations 6 to 8, the method further comprising selecting the first set of three-dimensional digital templates for artificial teeth from a plurality of sets of three-dimensional digital templates for artificial teeth.

10. The method of any of the previous feature combinations, the method further comprising selecting the second set of three-dimensional digital templates for artificial teeth from the plurality of sets of three-dimensional digital templates for artificial teeth.

11. The method of any of the previous feature combinations, one or more of the first set of three-dimensional digital templates for artificial teeth and the second set of three-dimensional digital templates for artificial teeth being a tooth library.

12. The method of any of the previous feature combinations, one or more of the first set of three-dimensional digital templates for artificial teeth and the second set of three-dimensional digital templates for artificial teeth being a set of three-dimensional digital templates for artificial teeth with the three-dimensional digital tooth models being scans of physical tooth models.

13. The method of feature combination 12, the method further comprising marking one or more dental key structures of the three-dimensional digital tooth models of the set of three-dimensional digital templates for artificial teeth with one or more identifiers identifying the respective one or more dental key structures.

14. The method of any of feature combinations 12 to 13, the method further comprising scanning physical tooth models and generating the set of three-dimensional digital templates for artificial teeth.

15. The method of any of the previous feature combinations, the three-dimensional digital anatomic model comprising one or more of the following: one or more three-dimensional digital maxillary anatomic structures of the patient, one or more three-dimensional digital mandibular anatomic structures of the patient.

16. The method of any of the previous feature combinations, the first set of three-dimensional digital templates for artificial teeth and the second set of three-dimensional digital templates for artificial teeth comprising one or more of the following: one or more three-dimensional digital models of one or more maxillary teeth, one or more three-dimensional digital models of one or more mandibular teeth.

17. The method of any of the previous feature combinations, the method further comprising providing data for controlling a manufacturing of one or more artificial teeth, the control data defining the adjusted one or more second three-dimensional digital tooth models as one or more templates for the one or more artificial teeth.

18. The method of feature combination 17, the method further comprising controlling the manufacturing of the one or more artificial teeth using the data provided for controlling the manufacturing, with the manufactured one or more artificial teeth being one or more physical copies of the one or more templates defined by the provided data.

19. A computer program product for replacing one or more first three-dimensional digital tooth models of a first set of three-dimensional digital templates for artificial teeth by one or more second three-dimensional digital tooth models of a second set of three-dimensional digital templates for artificial teeth, the computer program product comprising a non-transitory computer readable storage medium having program instructions embodied therewith, the program instructions being executable by a processor of a computer device to cause the computer device to:

receive a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, select one or more first three-dimensional digital tooth models of the one or more arranged first three-dimensional digital tooth models for a replacement, replace the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the one or more arranged second three-dimensional digital tooth models, such that the identified one or more dental key structures of the adjusted one or more second three-dimensional digital tooth models match the one or more identified dental key structures of the selected one or more first three-dimensional digital tooth models.

20. A computer program for replacing one or more first three-dimensional digital tooth models of a first set of three-dimensional digital templates for artificial teeth by one or more second three-dimensional digital tooth models of a second set of three-dimensional digital templates for artificial teeth, the computer program comprising program instructions, which are executable by a processor of a computer device to cause the computer device to:

receive a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, select one or more first three-dimensional digital tooth models of the one or more arranged first three-dimensional digital tooth models for a replacement, replace the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the one or more arranged second three-dimensional digital tooth models, such that the identified one or more dental key structures of the adjusted one or more second three-dimensional digital tooth models match the one or more identified dental key structures of the selected one or more first three-dimensional digital tooth models.

21. A computer device for replacing one or more first three-dimensional digital tooth models of a first set of three-dimensional digital templates for artificial teeth by one or more second three-dimensional digital tooth models of a second set of three-dimensional digital templates for artificial teeth, the computer device comprising a processor and a memory storing program instructions executable by the processor, execution of the program instructions by the processor causing the computer device to:

receive a three-dimensional digital anatomic model of an oral anatomic structure of a patient with the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, select one or more first three-dimensional digital tooth models of the one or more arranged first three-dimensional digital tooth models for a replacement, replace the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the arranged one or more second three-dimensional digital tooth models, such that the identified one or more dental key structures of the adjusted one or more second three-dimensional digital tooth models match the one or more identified dental key structures of the selected one or more first three-dimensional digital tooth models.

22. A manufacturing system comprising the computer device of feature combination 21, the manufacturing system further comprising one or more manufacturing devices configured to manufacture one or more artificial teeth, execution of the program instructions by the processor further causing the computer device to: provide data for controlling the manufacturing of the one or more artificial teeth, the control data defining the adjusted one or more second three-dimensional digital tooth models as one or more templates for the one or more artificial teeth, control the one or more manufacturing devices to manufacture the artificial teeth using the data provided for controlling the manufacturing with the one or more artificial teeth manufactured being physical copies of the adjusted one or more second three-dimensional digital tooth models.

REFERENCE SIGNS LIST 10 computer device 11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard

48

58 mouse
59 scanner
60 3D printing device
62 printing element
70 machining device
72 machining tool
74 holding device
76 blank
78 raw material
100 3D digital model
102 dental key structure
104 identifier
110 3D digital model
112 dental key structure
114 identifier
120 3D digital model
122 dental key structure
124 identifier
130 artificial tooth

The invention claimed is:

1. A method for replacing one or more first three-dimensional digital tooth models of a first set of three-dimensional digital templates for artificial teeth by one or more second three-dimensional digital tooth models of a second set of three-dimensional digital templates for artificial teeth, the method comprising:

receiving a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, selecting one or more first three-dimensional digital tooth models of the one or more arranged first three-dimensional digital tooth models for a replacement, replacing the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the one or more arranged second three-dimensional digital tooth models, such that the identified one or more dental key structures of the adjusted one or more second three-dimensional digital tooth models match the one or more identified dental key structures of the selected one or more first three-dimensional digital tooth models.

2. The method of claim 1, the adjusting of the one or more shapes of the arranged one or more second three-dimensional digital tooth models comprising applying one or more adjustments to one or more sections of the one or more shapes comprising the identified one or more dental key structures, the applied adjustments comprising one or more of the following adjustments: a translation, a rotation, a scaling, a deformation.

3. The method of claim 2, the method further comprising maintaining positions, orientations, sizes, and shapes of remaining sections of the one or more shapes of the one or more second three-dimensional digital tooth models, while adjusting the sections of the one or more second three-dimensional digital tooth models comprising the identified one or more dental key structures.

4. The method of claim 1, the arranging of the one or more second three-dimensional digital tooth models comprising scaling sizes of one or more of the second three-dimensional digital tooth models.

5. The method of claim 1, the one or more dental key structures comprising one or more of the following: occlusal contact patches, approximal contact patches, cervical boundary lines, equatorial lines, chewing surfaces, cusps, fissures, incisal edges.

6. The method of claim 1, the receiving of the three-dimensional digital anatomic model and the one or more first three-dimensional digital tooth models comprising:

receiving the three-dimensional digital anatomic model without the one or more first three-dimensional digital tooth models of the first set of three-dimensional digital templates for artificial teeth, receiving the one or more first three-dimensional digital tooth models, arranging the received one or more first three-dimensional digital tooth models with respect to the three-dimensional digital anatomic model at the one or more tooth positions with the one or more tooth orientations.

7. The method of claim 6, the arranging of the received one or more first three-dimensional digital tooth models comprising an adjusting of the received one or more first three-dimensional digital tooth models to one or more anatomical conditions of the patient defined by the three-dimensional digital anatomic model.

8. The method of claim 7, the adjusting of the received one or more first three-dimensional digital tooth models comprising one or more of the following: scaling sizes of one or more of the received one or more first three-dimensional digital tooth models, deforming one or more of the received one or more first three-dimensional digital tooth models.

9. The method of claim 6, the method further comprising selecting the first set of three-dimensional digital templates for artificial teeth from a plurality of sets of three-dimensional digital templates for artificial teeth.

10. The method of claim 1, the method further comprising selecting the second set of three-dimensional digital templates for artificial teeth from the plurality of sets of three-dimensional digital templates for artificial teeth.

11. The method of claim 1, one or more of the first set of three-dimensional digital templates for artificial teeth and the second set of three-dimensional digital templates for artificial teeth being a tooth library.

12. The method of claim 1, one or more of the first set of three-dimensional digital templates for artificial teeth and the second set of three-dimensional digital templates for artificial teeth being a set of three-dimensional digital templates for artificial teeth with the three-dimensional digital tooth models being scans of physical tooth models.

13. The method of claim 12, the method further comprising marking one or more dental key structures of the three-dimensional digital tooth models of the set of three-dimensional digital templates for artificial teeth with one or more identifiers identifying the respective one or more dental key structures.

14. The method of claim 12, the method further comprising scanning physical tooth models and generating the set of three-dimensional digital templates for artificial teeth.

15. The method of claim 1, the three-dimensional digital anatomic model comprising one or more of the following: one or more three-dimensional digital maxillary anatomic structures of the patient, one or more three-dimensional digital mandibular anatomic structures of the patient.

16. The method of claim 1, the method further comprising providing data for controlling a manufacturing of one or more artificial teeth, the control data defining the adjusted one or more second three-dimensional digital tooth models as one or more templates for the one or more artificial teeth.

17. The method of claim 16, the method further comprising controlling the manufacturing of the one or more artificial teeth using the data provided for controlling the manufacturing, with the manufactured one or more artificial teeth being one or more physical copies of the one or more templates defined by the provided data.

18. A computer program product for replacing one or more first three-dimensional digital tooth models of a first set of three-dimensional digital templates for artificial teeth by one or more second three-dimensional digital tooth models of a second set of three-dimensional digital templates for artificial teeth, the computer program product comprising a non-transitory computer readable storage medium having program instructions embodied therewith, the program instructions being executable by a processor of a computer device to cause the computer device to:

receive a three-dimensional digital anatomic model of an oral anatomic structure of a patient and the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, select one or more first three-dimensional digital tooth models of the one or more arranged first three-dimensional digital tooth models for a replacement, replace the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the one or more arranged second three-dimensional digital tooth models, such that the identified one or more dental key structures of the adjusted one or more second three-dimensional digital tooth models match the one or more identified dental key structures of the selected one or more first three-dimensional digital tooth models.

19. A computer device for replacing one or more first three-dimensional digital tooth models of a first set of three-dimensional digital templates for artificial teeth by one or more second three-dimensional digital tooth models of a second set of three-dimensional digital templates for artificial teeth, the computer device comprising a processor and a memory storing program instructions executable by the processor, execution of the program instructions by the processor causing the computer device to:

receive a three-dimensional digital anatomic model of an oral anatomic structure of a patient with the one or more first three-dimensional digital tooth models of the first set of three-dimensional digital templates for artificial teeth arranged with respect to the three-dimensional digital anatomic model at one or more tooth positions with one or more tooth orientations, the one or more first three-dimensional digital tooth models comprising one or more dental key structures marked with one or more first identifiers identifying the one or more dental key structures, select one or more first three-dimensional digital tooth models of the one or more arranged first three-dimensional digital tooth models for a replacement, replace the selected one or more first three-dimensional digital tooth models by the one or more second three-dimensional digital tooth models of the second set of three-dimensional digital templates for artificial teeth, the one or more second three-dimensional digital tooth models comprising one or more dental key structures marked with one or more second identifiers identifying the one or more dental key structures, the replacing comprising:

arranging the one or more second three-dimensional digital tooth models with respect to the three-dimensional digital anatomic model at the one or more tooth positions of the selected one or more first three-dimensional digital tooth models and with the one or more tooth orientations of the selected one or more first three-dimensional digital tooth models, identifying the one or more dental key structures of the selected one or more first three-dimensional digital tooth models using the one or more first identifiers, identifying the one or more dental key structures of the arranged one or more second three-dimensional digital tooth models using the one or more second identifiers, adjusting one or more shapes of the arranged one or more second three-dimensional digital tooth models, such that the identified one or more dental key structures of the adjusted one or more second three-dimensional digital tooth models match the one or more identified dental key structures of the selected one or more first three-dimensional digital tooth models.

20. A manufacturing system comprising the computer device of claim 19, the manufacturing system further comprising one or more manufacturing devices configured to manufacture one or more artificial teeth, execution of the program instructions by the processor further causing the computer device to:

provide data for controlling the manufacturing of the one or more artificial teeth, the control data defining the adjusted one or more second three-dimensional digital tooth models as one or more templates for the one or more artificial teeth, control the one or more manufacturing devices to manufacture the artificial teeth using the data provided for controlling the manufacturing with the one or more artificial teeth manufactured being physical copies of the adjusted one or more second three-dimensional digital tooth models.

* * * * *